(12) United States Patent
Wernick et al.

(10) Patent No.: US 9,547,369 B1
(45) Date of Patent: Jan. 17, 2017

(54) DYNAMIC SORTING AND INFERENCE USING GESTURE BASED MACHINE LEARNING

(71) Applicant: Mr. Buzz, Inc., Los Gatos, CA (US)

(72) Inventors: Grant M. Wernick, Los Gatos, CA (US); Forrest H. Wernick, Los Gatos, CA (US); Jacob A. Perkins, Los Gatos, CA (US); Arnold M. Wernick, Los Gatos, CA (US)

(73) Assignee: Mr. Buzz, Inc., Los Gatos, CA (US)

( * ) Notice: Subject to any disclaimer, the term of this patent is extended or adjusted under 35 U.S.C. 154(b) by 141 days.

(21) Appl. No.: 13/841,263

(22) Filed: Mar. 15, 2013

Related U.S. Application Data

(63) Continuation-in-part of application No. 13/479,092, filed on May 23, 2012.

(60) Provisional application No. 61/498,599, filed on Jun. 19, 2011, provisional application No. 61/621,524, filed on Apr. 8, 2012, provisional application No. 61/650,868, filed on May 23, 2012.

(51) Int. Cl.
*G06F 17/30* (2006.01)
*G06F 3/0488* (2013.01)
*G06F 3/01* (2006.01)

(52) U.S. Cl.
CPC ..................... *G06F 3/017* (2013.01)

(58) Field of Classification Search
CPC ... G06F 3/017; G06F 3/0488; G06F 17/30905
See application file for complete search history.

(56) References Cited

U.S. PATENT DOCUMENTS

| | | | |
|---|---|---|---|
| 7,428,533 B2 | 9/2008 | Kapur et al. | |
| 7,743,067 B2 | 6/2010 | Ducheneaut et al. | |
| 7,937,402 B2 | 5/2011 | Feng et al. | |
| 7,983,659 B2 | 7/2011 | Shinya | |
| 8,315,918 B1 | 11/2012 | Karonis et al. | |
| 8,725,672 B2 | 5/2014 | Rostampour et al. | |
| 2003/0036848 A1 | 2/2003 | Sheha et al. | |
| 2005/0120311 A1* | 6/2005 | Thrall | 715/811 |
| 2006/0010117 A1* | 1/2006 | Bonabeau et al. | 707/3 |
| 2008/0171559 A1 | 7/2008 | Frank et al. | |
| 2009/0119234 A1* | 5/2009 | Pinckney et al. | 706/12 |
| 2009/0164489 A1* | 6/2009 | Matsuda et al. | 707/100 |
| 2009/0186700 A1 | 7/2009 | Konkle | |
| 2010/0090971 A1* | 4/2010 | Choi et al. | 345/173 |
| 2010/0095240 A1* | 4/2010 | Shiplacoff | G06F 3/0483 715/784 |
| 2010/0302056 A1 | 12/2010 | Dutton et al. | |

(Continued)

OTHER PUBLICATIONS

U.S. Appl. No. 13/479,092—Office Action dated Nov. 6, 2014, 19 pages, reviewed by counsel Nov. 10, 2014.

*Primary Examiner* — Sangwoo Ahn
(74) *Attorney, Agent, or Firm* — Haynes Beffel & Wolfeld LLP; Ernest J. Beffel, Jr.

(57) ABSTRACT

The technology disclosed relates to identification of future activity options. In particular, it relates to identifying future activity options that are similar to a selected future activity, similar to past activities, that meet descriptive language criteria, that form compatible sequences of activities, or that form compatible multi-day sequences of activities. The technology disclosed also relates to rapid and convenient sorting through activity options.

17 Claims, 15 Drawing Sheets

(56) References Cited

U.S. PATENT DOCUMENTS

| | | | |
|---|---|---|---|
| 2011/0059769 A1* | 3/2011 | Brunolli | G08C 17/02 455/556.1 |
| 2011/0131537 A1* | 6/2011 | Cho et al. | 715/863 |
| 2011/0144903 A1 | 6/2011 | Gupta et al. | |
| 2011/0157047 A1* | 6/2011 | Nakagawa | G06F 3/0482 345/173 |
| 2011/0167078 A1* | 7/2011 | Benjamin | G06Q 10/109 707/769 |
| 2011/0196864 A1* | 8/2011 | Mason | G06F 3/0416 707/728 |
| 2011/0202877 A1* | 8/2011 | Lassonde | G06F 3/0482 715/817 |
| 2011/0238676 A1* | 9/2011 | Liu | G01S 5/02 707/752 |
| 2013/0132883 A1* | 5/2013 | Vayrynen | G06F 3/0482 715/773 |

\* cited by examiner

| | Gary D (anchor) | Minnie | Pizza Place | 11 Jefferson | The Opera |
|---|---|---|---|---|---|
| Category | Food | Food | Food | Food | Performance |
| City | San Francisco | San Francisco | San Francisco | San Francisco | San Francisco |
| Classiness | 100 | 95 | 5 | 95 | 100 |
| Kid Friendly | No | No | Yes | No | No |
| Cost | $$$$ | $$$$ | $ | $$$$ | $$$$ |
| Trendiness | 50 | 80 | 10 | 100 | 40 |
| Good for Groups | No | Yes | Yes | No | Yes |
| Overall Rating | 4.5 | 5 | 3 | 5 | 4 |
| Guys Score | 70 | 80 | 100 | 75 | 30 |
| Girls Score | 80 | 100 | 40 | 90 | 100 |
| Similarity to Anchor | 100 | 85 | 5 | 95 | 97.6 |

Fig. 2 – Similarity matrix

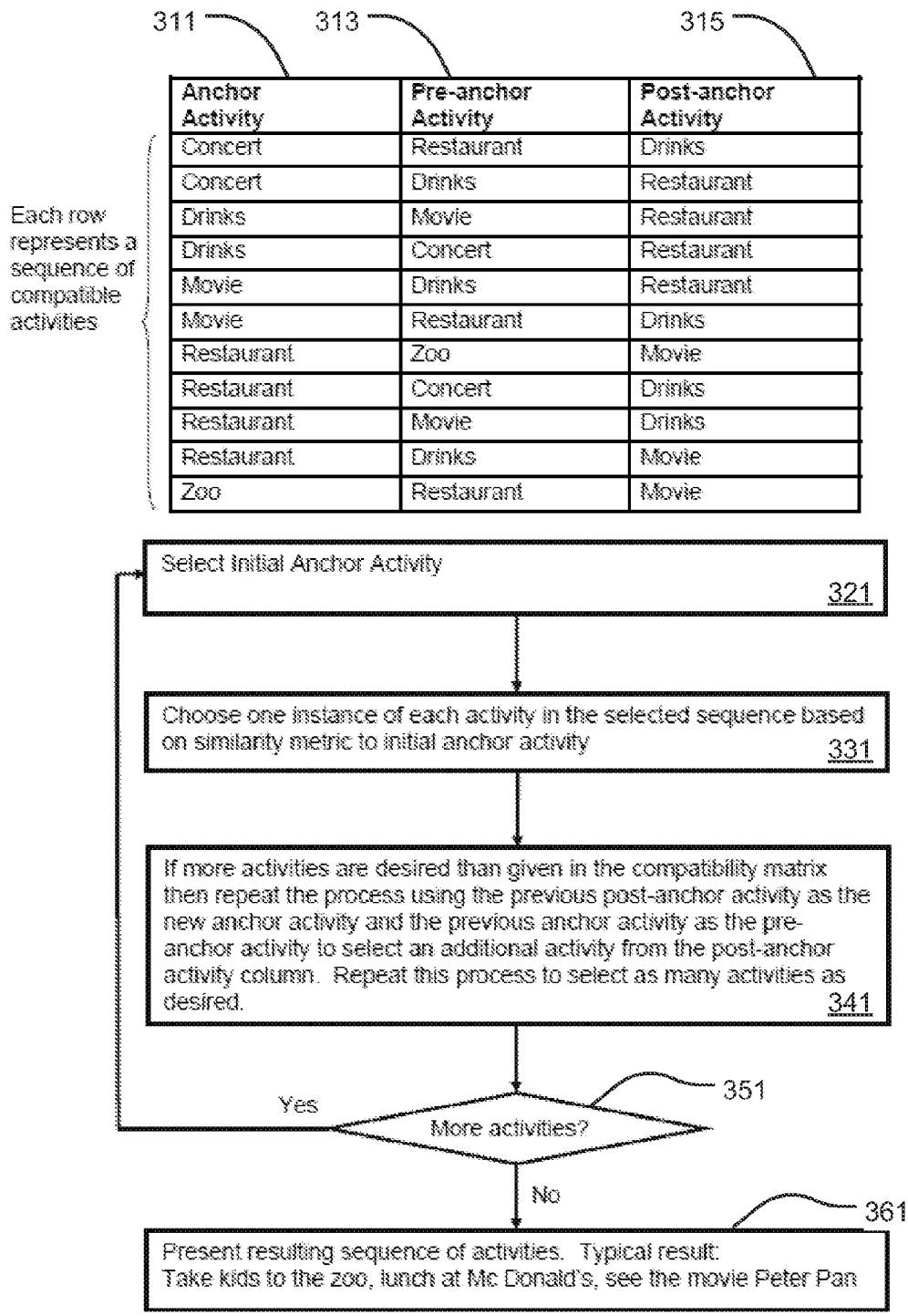
Fig. 3 – Compatibility Analysis

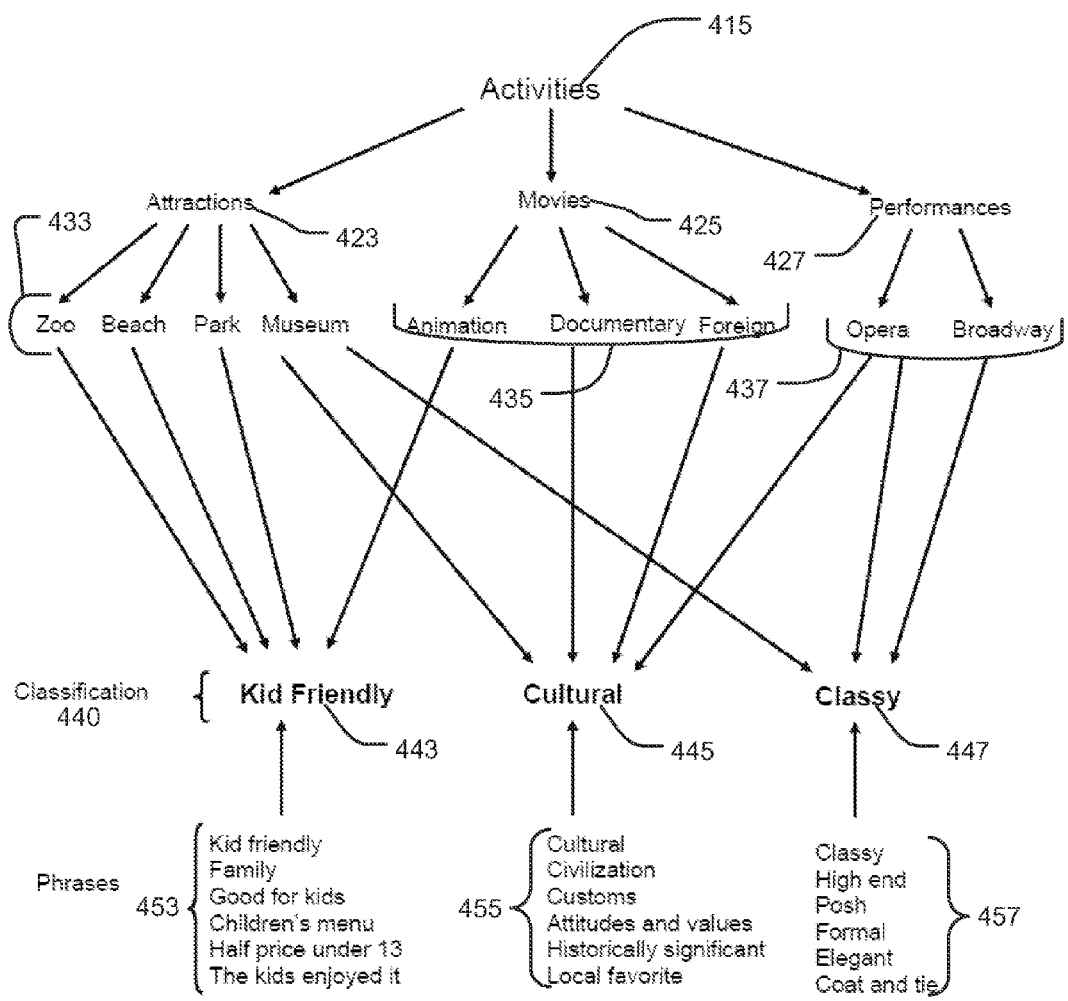
Fig. 4 – Multi-Dimensional Taxonomy Mapping

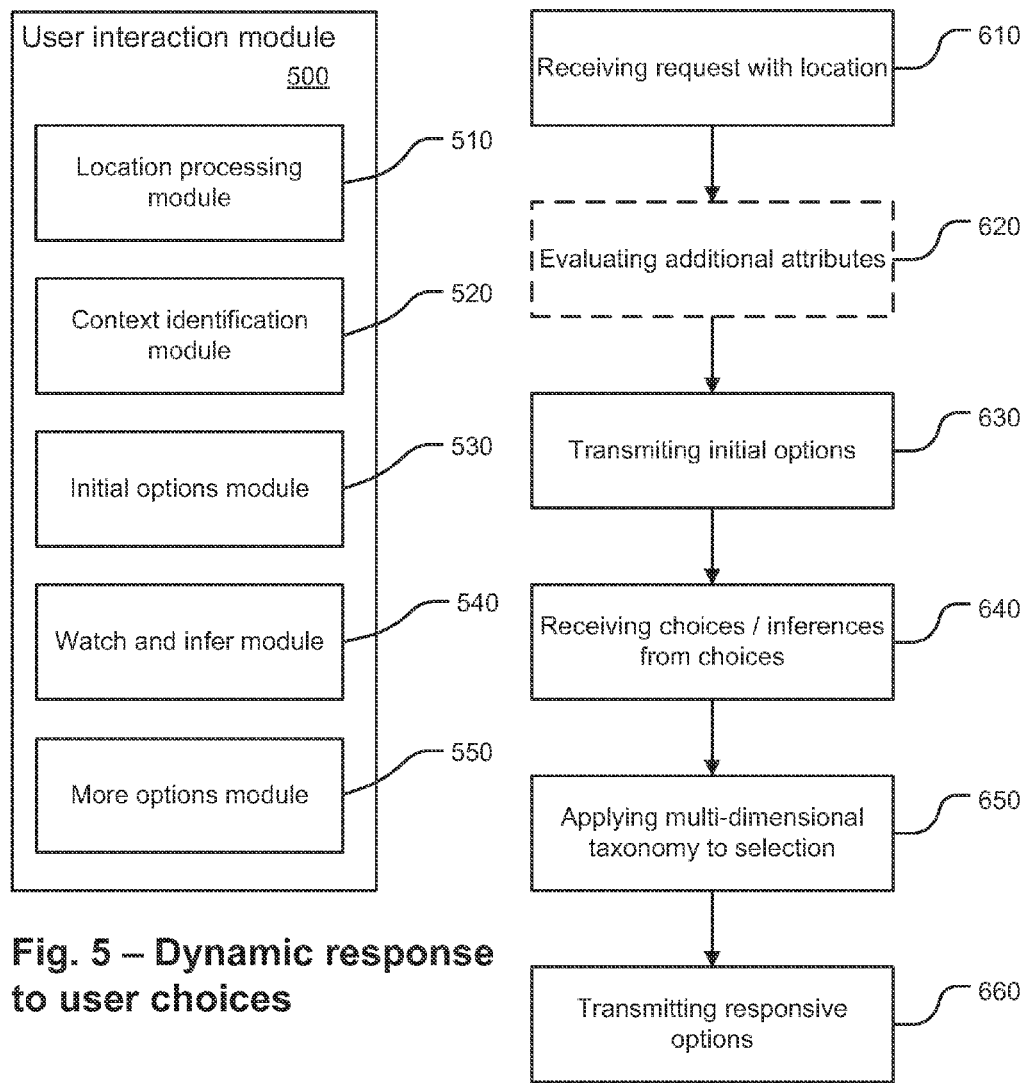

Fig. 8 – Description analysis and suggestions

Fig. 11 – Sequence of activities in a day

Fig. 15 – More like past examples

Fig. 17 – Past Activities Mapping

DYNAMIC SORTING AND INFERENCE USING GESTURE BASED MACHINE LEARNING

RELATED APPLICATION

This application is a continuation-in-part of U.S. patent application Ser. No. 13/479,092, entitled, "Personal Concierge Plan and Itinerary Generator," filed on 23 May 2012, which claims the benefit of three US Provisional Patent Applications, including: No. 61/498,599, entitled, "Personal Concierge Plan and Itinerary Generator," filed on 19 Jun. 2011; No. 61/621,524, entitled, "Dynamic Sorting and Inference Using Gesture Based Machine Learning," filed 8 Apr. 2012; and No. 61/650,868, entitled, "Personal Concierge Plan and Itinerary Generator," filed on 23 May 2012. The related applications and priority applications are hereby incorporated by reference for all purposes.

BACKGROUND

The technology disclosed relates to identification of future activity options. In particular, it relates to identifying future activity options that are similar to a selected future activity, similar to past activities, that meet descriptive language criteria, that form compatible sequences of activities, or that form compatible multi-day sequences of activities. The technology disclosed also relates to rapid and convenient sorting through activity options.

There are abundant sources of information for purchasing plane tickets, booking tables and reading reviews. Some of the sources allow more or less localized searches. Many of the interfaces are cumbersome and require considerable study.

An opportunity arises to develop better interfaces for planning future activities. Better, more easily operated, more resilient and transparent consumer experiences and systems may result.

SUMMARY

The technology disclosed relates to identification of future activity options. In particular, it relates to identifying future activity options that are similar to a selected future activity, similar to past activities, that meet descriptive language criteria, that form compatible sequences of activities, or that form compatible multi-day sequences of activities. The technology disclosed also relates to rapid and convenient sorting through activity options. Particular aspects of the technology disclosed are described in the claims, specification and drawings.

BRIEF DESCRIPTION OF THE DRAWINGS

FIG. 2 is a limited example of a similarity matrix.

FIG. 3 illustrates a compatibility analysis.

FIG. 4 illustrates multi-dimensional qualitative taxonomy mapping.

FIG. 5 is a block diagram of an example user interaction module.

FIG. 6 is a high level flow chart illustrating an example process for dynamic responding to user choices.

FIG. 8 is a block diagram of an example descriptive language module.

FIG. 11 is a block diagram of an example of a sequence building module.

FIG. 15 is a block diagram of an example of a module that accepts past activity examples with query parameters.

DETAILED DESCRIPTION

The following detailed description is made with reference to the figures. Preferred embodiments are described to illustrate the technology disclosed, not to limit its scope, which is defined by the claims. Those of ordinary skill in the art will recognize a variety of equivalent variations on the description that follows.

Figure 1:
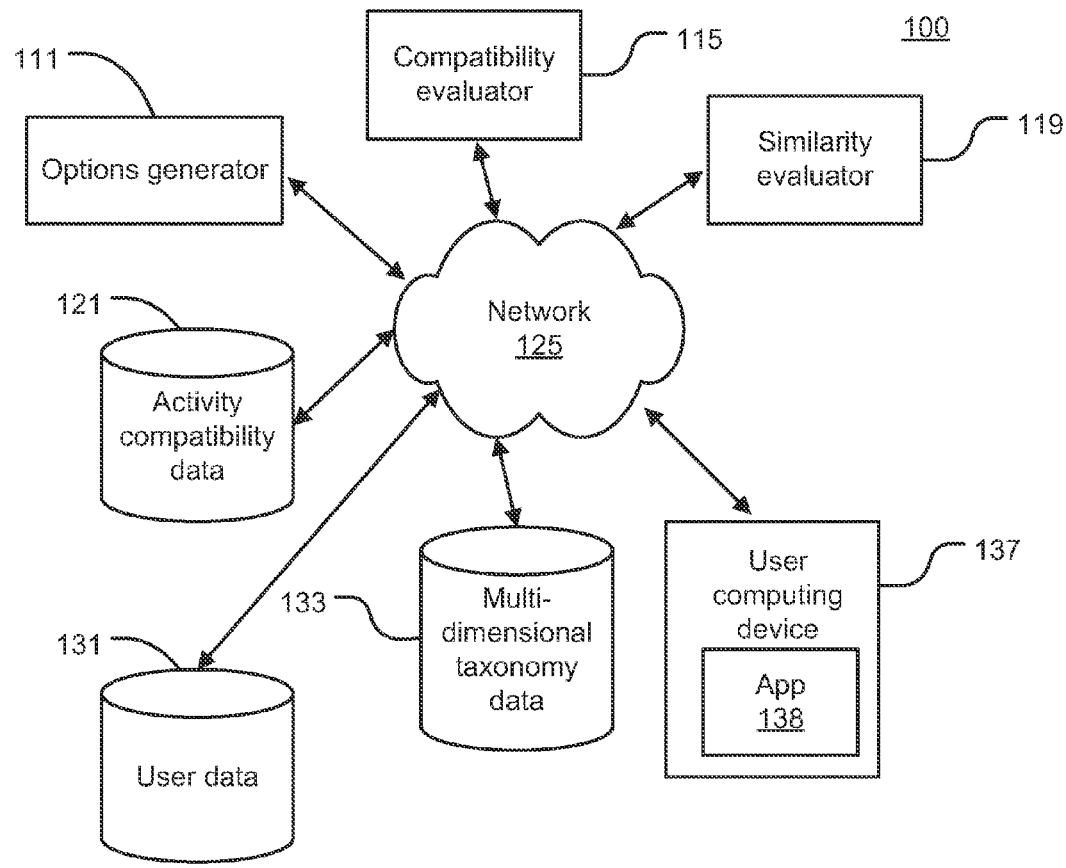
FIG. 1 illustrates a block diagram of an example environment 100 in which the personal concierge plan and itinerary generator technologies disclosed herein can be used.

FIG. 1 illustrates a block diagram of an example environment 100 in which the personal concierge plan and itinerary generator technologies disclosed herein can be used. The environment 100 includes a user computing device 137, and options generator 111, compatibility evaluator 115 and the similarity evaluator 119. The environment also includes a communication network 125 that allows communication between various components of the environment 100. It further includes one or more databases for activity compatibility data 121, user data 131, and multidimensional qualitative taxonomy data 133.

In one implementation, the network 125 includes the Internet. The network 125 also utilizes dedicated or private communication links that are not necessarily part of the Internet. In one implementation, the network 125 uses standard communication technologies, protocols and/or inter-process communication technologies.

During operation, the user interacts with one or more of the options generator, 111, compatibility evaluator 115 and similarity evaluator 119 through use of the user computing device 137 and an app or application 138. The client computing device 137, options generator 111, compatibility evaluator 115 and similarity evaluator 119 each include memory for storage of data and software applications, a processor for accessing data and executing applications, and components that facilitate communication over the communication network 125.

The user computing device 137 executes an application 138 which allows the user to interact with the personal concierge plan and itinerary generator. This application could be a web browser. For many platforms, a custom application adapted to rapidly handle graphical displays and user gestures may perform better than a browser. The user computing device 137 may be, for example, a desktop computer, a laptop, tablet computer, a mobile phone, or any other type of computing device.

The options generator 111 receives initial parameters from the user computing device 137 and generates options for future activities that conform to plan more itineraries. The options generator 111 maybe invoked several times, depending on the operations being performed. The options generator may attain user data from the user database 131 as part of the initial parameters used to generate options. It can interact with the activity compatibility database 121 to identify activity options. For example, in response to a location, such as San Francisco, and a late afternoon time of day, the options generator may identify restaurant, movie and live performance options for future activities.

The environment 100 also includes a compatibility evaluator 115. The compatibility evaluator 115 interacts with activity compatibility data 121 when sequences of activities are constructed. Activity compatibility can depend on location, time and a variety of activity characteristics. Examples of activity characteristics include classiness, kid friendly, cost, trendiness, good for groups, guys score and girls score. The sequence of activities may include an anchor activity, a pre-anchor activity that precedes the anchor activity in time, and a post anchor activity that comes after the anchor activity. In most instances, the sequence of activities will include activities from differing categories.

The similarity evaluator 119 interacts with the multidimensional qualitative taxonomy data 133. The similarity evaluator evaluates dimensions of similarity available for inference or comparison. It also evaluates similarity of two or more places, activities or events across multiple dimensions. When the similarity evaluator is evaluating dimensions of similarity, it may interact with a multidimensional qualitative taxonomy as illustrated in FIG. 4. When it is evaluating similarity of various places, activities or events, it may interact with a similarity matrix as illustrated in FIG. 2.

Several factors can be employed to effect personalization of plans, used independently or in combination. Some factors include:

1. Respective and/or collective demographics of the people collaborating on and/or invited to a plan.
2. The "vibe" (mood) of a plan. Examples: casual, classy, touristy.
3. Location of current and/or previous plans.
4. Date and time of overall plan.
5. Respective and/or collective tastes of the people collaborating on and/or invited to a plan.
6. User ratings on plan items may be used to limit the inclusion of negatively rated items in plans for the individual user who provided the negative rating.

These factors may be acquired from a variety of sources, including:

1. Input and feedback from creators, collaborators, invitees and/or attendees for current and/or previous plans.
2. Sensor derived information such as that from a location enabled device.
3. Third party data sources (e.g., social networks, website tracking and/or purchasing information).

The information obtained from all sources may be kept in one or more databases 121, 131, 133. This may include information about users, user preference(s), plans, items, etc. Some of the item related information in the database may be created and updated on an ongoing basis by "crawling" the Internet to gather information on places, events and other items of possible interest to a user. Alternatively this information may be gathered via an applications program interface (API) that allows more direct access to an information source, such as the StubHub (event ticket provider) API. As an example consider a restaurant. Information collected about a restaurant may include: name, location, type of food, price range, ratings by users, hours of operation and reviews. The reviews may be analyzed in many different ways: one way is to search for the frequency of occurrence of specific words or phrases such as "great food", "excellent service", "romantic atmosphere". These can be entered into a "dictionary" and associated with specific categories for use in classifying items. In one embodiment, their association with a specific category may be based on tacit knowledge or discovered and trained using natural language tools such as the open source NLTK. For instance, the presence of the phrase "romantic atmosphere" may allow the underlying item to be tagged with the classification "Dating". Likewise the presence of the phrase "kid friendly" may result in tagging an item with the classification "Family". A higher frequency of occurrence in one or more reviews implies a "better", i.e., more reliable, classification result. These are some forms of natural language processing which can be used to quantitatively classify an item into various categories which correspond to search attributes that in turn reflect a user's preference(s). One example is price, as may be indicated by the presence of some number of consecutive dollar signs "$$$" or a phrase such as "Average price: $50" in the text. A user may choose an item such as a restaurant in part based on the average price of a meal.

Natural language processing techniques may be used to classify items based on analyzing textual descriptions such as reviews. The various techniques described above may also be used to classify other items such as movies, concerts, etc. Since they are based on mathematical and logical rules, they lend themselves to being easily and consistently applied to large numbers of items, which in turn provides a wide variety of possible choices for the user.

FIG. 2 is a limited example of a similarity matrix. This example is limited both in the number of activities reflected in its columns 210 and the number of characteristics of each activity in the rows 220. In the columns, four restaurants and a performance of the opera are represented. In the rows, the characteristics of the activities include category, such as food or performance; city, which could be refined to neighborhood or address, or latitude and longitude; classiness; kid friendly; cost; trendiness; good for groups; overall rating; guys score; and girls score. Many additional characteristics can be applied and characteristics applied are adaptable. Based on a metric that is described below, the final row is a calculated similarity to the anchor activity. In this similarity scoring, 100 is perfect similarity and five is extremely low similarity.

FIG. 3 includes rows that represent sequences of compatible activities and a flowchart for selecting compatible activities. In the table, the columns represent an anchor activity 311, a pre-anchor activity 313 and a post-anchor activity 315. For instance, a concert may be preceded by dinner at a restaurant and followed by drinks Or, it could be preceded by drinks and followed by dinner. A visit to zoo could be preceded by lunch and followed by a movie. Each row in the table represents the sequence of compatible activities. The compatibility of these activities for forming a sequence may be calculated for manually and post.

The bottom section of FIG. 3 is a flowchart illustrating an example process for identifying sequences of activities.

Other embodiments may perform the steps in different orders and/or perform different or additional steps than the ones illustrated in FIG. 3. For convenience, FIG. 3 will be described with reference to the system of one or more computers that perform the process. The system can be, for example, the compatibility evaluator 115 interacting with the activity compatibility data 121 described above with reference to FIG. 1.

At step 321, the system selects an initial anchor activity. It may be acting upon location and time data, user-specified criteria, prior activities or any initial specification from which an initial anchor activity can be selected.

At step 331, the system uses the rows of the table that represent sequences of compatible activities. The system chooses one instance of each activity in the selected sequence. It may repeat the selected sequence multiple times. The selection of activities in a selected sequence is based at least in part on a similarity metric that measures similarity of pre- and post-anchor activities to the anchor activity.

At step 341, additional sequences of activities can be prepared using either the post-anchor activity as a new anchor activity or the pre-anchor activity as the new activity. Then, sequences are constructed in adding a third activity to the pair already constructed.

At step 351, the current count of activity sequences is evaluated. If more activity sequences are desired, more initial anchor activities can be selected 321. If enough activity sequences already been constructed, resulting sequences of activities can be presented. For instance, a sequence of activities may be to take the kids to the zoo, after lunch at McDonald's, followed by seeing the movie Peter Pan. This corresponds to the last row in the table of FIG. 3.

Feedback may be incorporated into item classifications, rules and/or templates to improve plan generation. Optionally, feedback on specific item classifications may be used to refine or modify those item classifications. Feedback may be acquired during the planning process, while the plan is being executed and/or thereafter. Examples of feedback are:

1. Plan and/or plan item interaction such as browsing details.
2. Time spent interacting with plan and/or item, modifying a plan and/or item.
3. Purchasing an item (e.g., making a restaurant reservation).
4. Inviting others to collaborate and/or attend, and/or obtaining associated RSVPs.
5. Electronic confirmation that some aspect of the plan has been or is expected to be fulfilled (e.g., credit card transaction, ticket purchase, restaurant check paid).
6. Real-time feedback that a user(s) is present at location associated with a plan item (e.g., location-centric check-in such as FourSquare).
7. Attendee comments, ratings and/or reviews.

Feedback from large numbers of people may be collected and used to discover correlations among items. For example, feedback from users who have attended concerts at a particular venue may indicate that a significant number of attendees at concerts performed at that particular venue often go to a nearby restaurant afterwards for dinner. This information may be incorporated in plans generated for concerts at that venue by suggesting dinner afterwards at the nearby restaurant. Users who build plans around that concert venue would benefit as a result of prior feedback since they would see more plans that include the nearby restaurant. Depending on the feedback available, finer-grained correlations may be discovered among different plan items. For example, it may be learned that attendees of concerts at a particular venue prefer one restaurant, while attendees of comedy shows at the same venue prefer a different restaurant. Optionally, any correlations among items may be used independently of plans for other purposes such as providing the user a list of items that correlate with a particular item (e.g., providing a list of "classy" bars that complement a particular "classy" restaurant).

FIG. 4 illustrates a multi-dimensional qualitative taxonomy mapping. The activities 415 include attractions 423, movies 425 and performances 427, all organized under activities. Similar groupings could be organized for places, events, performances, etc. Examples of attractions 423 include the zoo, beach, park and museum 433. Categories of movies 425 include animation, documentary and foreign 435. Categories of performances 427 include Opera on Broadway performances 437. One will immediately recognize that this hierarchy will typically extend to additional levels, such as multiple animation movies or foreign movies.

In FIG. 4, three dimensions of classification 440 are identified: kid friendly 443, cultural 445, and classy 447. Many additional dimensions of classification will be applied to a larger hierarchy of activities.

FIG. 4 also identifies phrases of descriptive language from which classifications can be inferred. The classification kid friendly could be inferred for many of the phrases kid friendly, family, good for kids, children's menu, half price under 13 or the kids enjoyed it 453. The classification cultural 445 could be inferred from many of the phrases cultural, civilization, customs, attitudes and values, historically significant or local favorite 455. The classification classy 447 could be inferred from many of the phrases classy, high-end, posh, formal, elegant, or coat and tie 457.

The multidimensional qualitative taxonomy mapping takes advantage of a deep understanding of the subject domain. For the subject domain, recommending activities, dozens or even hundreds of characteristics could be identified and rated. In the multidimensional qualitative taxonomy mapping, specific activities such as the movie Peter Pan will be mapped by category from the top of the activities hierarchy for 415 downward. The activities also will be assigned classifications 440 that can be scored, used for determination of similarity, and used to organize alternative descriptive language.

In one implementation of the technology disclosed, the similarity matrix of FIG. 2 can be used to evaluate the similarity of two or more real-world places, services, or upcoming events. As illustrated in FIG. 2, a similarity matrix includes one or more of the following characteristics: how good each item is for a particular subject/type, occasion, group, mood, time of day. In a more complete similarity matrix, 100 to 200 characteristics may be evaluated across a full range of activities. Data in this matrix can be based on one or more of the following: the analysis of customer sentiment, place or event attributes and features, mapping of similar customer frequency, customer review analysis. This can be used to measure the similarity of two or more places within the same subject/type, such as two Japanese restaurants or different subjects/types like a music concert and a restaurant.

To illustrate evaluation of similarity using a multi-dimensional qualitative taxonomy, consider the example of finding activities similar to dinner at GaryD's in San Francisco. Data for this example appears in FIG. 2. The alternatives evaluated include food at Minnie's, Pizza Place or 11 Jefferson, and going to the Opera. The dimensions of the matrix appear in rows of the table. In the example, GaryD's is a classy restaurant. Not surprisingly, Pizza Place is not rated as classy. GaryD's is expensive and Pizza Place is not. On the dimensions of Guys Score and Girls Score, one sees a stereotypical generalization that guys are less interested in the Opera than girls. Of course, for a particular guy or girl, recorded history of choices or purchases made or locations visited might alter the weighting along these dimensions. One formula for calculating similarity would be similarity=100−distance. Applying this formula, a perfect similarity score is 100. The restaurant 11 Jefferson is so similar to GaryD's that it rates a similarity score of 95.

Distance is calculated by evaluating both numeric and non-numeric features. Non-numeric features can be evaluated using a binary distance: 1 if different, 0 if same. Or, categories can be enumerated and distances between enumerated category members can be specified. For cost, for instance, the cost distance can be the number of dollar signs difference, e.g. $$$$ vs. $$=a difference and distance of 2. This distance can be scaled:

$$\text{numeric distance} = \text{abs}(x-y)/\text{max possible value}$$

An example distance calculation and similarity score between The Opera and GaryD's=1 [category]+0 [city]+(abs(100−100)/100) [classiness]+0 [kids]+0 [cost]+abs((40−50)/100) [trendiness]+1 [groups]+(abs(4.5−4)/5) [rating]+(abs(70−30)/100) [guys]+(abs(80−100)/100) [girls]=>

$$1+0+0+0+0.1+1+0.1+0.4+0.2=2.8$$

$$100-2.8=97.6$$

One can use many more features to calculate distance and similarity metrics than can be succinctly explained. Feature distances can be weighted based on importance, and these weights can be different depending on the situation.

One application of the technology disclosed is an application that encourages a user to rapidly sort through images of alternative future activities, as illustrated in the priority provisional application 61/621,524, entitled, "Dynamic Sorting and Inference Using Gesture Based Machine Learning," filed 8 Apr. 2012.

FIG. 5 is a block diagram of an example user interaction module 500. The user interaction module 500 may operate on a server or on the user computing device 137. Its functionality can be spread across the user computing device 137 and the server. In FIG. 5, the user interaction module includes location processing module 510, a context identification module 520, an initial options module 530, a watch and infer module 540, and a more options module 550. Some implementations may have different and/or additional modules than those shown in FIG. 5. Moreover, the functionalities can be distributed among the modules and across the hardware platforms in a different manner than described herein.

The user interaction module generates presentations for the user computing device to display to the user in response to user interaction with the user computing device 137. Responsive to the user, it offers future activities for user selection or rejection that take into account a variety of factors, including the user's ongoing responses to activities offered.

The location processing module 510 determines a starting location for activities to be presented. This location can be obtained from the user computing device 137 or by a user entry. User entry can be by setting up a marker on a map, selecting a city, neighborhood or address from a list, or free text entry. Entries can be made using a keyboard, mouse, touch screen or microphone. In addition to an initial location, location processing module may set the maximum distance from the initial location. The maximum distance can be set as a radius or a geographic region, such as The City and County of San Francisco or North Lake Tahoe.

A context identification module 520 optionally determines if any initial context should be taken into account. For instance, past choices by user, recent browsing using a web browser, locations recently visited or purchases made by the user might be used to set a context. One or more of these features might, for instance, suggest whether a more or less costly venue would be likely to interest the user. In addition, explicit filters may be provided that allow the user to specify a context. Such filters could be available to the user for selection of initial options or to organize user-selected options from among the activity options presented.

An initial options module 530 generates activity options based on initially available location, time, weather, context and/or other available information. This information is organized into presentation for the user computing device 137 to display to the user.

A watch and infer module 540 receives data representing user choices responsive to activity options presented. A user can, for instance, reject or accept an activity option. A user could also classify group options using an interface that presented more than just a binary choice. The watch and infer module 540 uses the multidimensional qualitative taxonomy mapping to evaluate positive and/or negative choices and identify dimensions of consideration being applied by user. When sufficient information is available to inferred positive or negative response along the particular dimension, future activities can be emphasized or eliminated from consideration responsive to data representing the user choices. For instance, if the user selects high-end food options, the presentation of activity options made emphasized expensive restaurants and eliminate from additional activity options most pizza joints.

A more options module 550 uses results from the watch and infer module 540 to select additional activity options for presentation and display by the user computing device 137. The additional activity options are selected by the more options module taking advantage of both initial information and inferences from user choices. The additional activity options are presented as the user continues to make choices and the watch and infer module continues to receive data representing the user choices.

The system's response may take many forms. For example, the system can present an indirect response to the user by dynamically changing the objects such as images, and/or information presented to the user for selection/rejection to include more items that are similar to those already selected and/or fewer items similar to those rejected. Or it can present a direct response to the user such as text or icons which, for example, indicate "more like this" or "fewer like this," or any other appropriate feedback to aid the user in performing more effective and efficient actions to select, reject, sort, categorize, or otherwise organize or act upon a collection of objects which could represent tangible items (e.g., restaurants) or intangible items (e.g., quotes from recent financial sources).

Databases comprising objects of possible interest to users may reside locally on the client device and/or remotely on servers. Real-time queries may be made to such databases to provide feedback to users.

The user interaction module can be used to present activity options responsive to user choices, as the user is choosing. Initial activity options near a geographic location can be presented. Optionally, these choices can be constrained by with other filter criteria. The user interaction module can receive user choices that discard or add to a short list the options presented, evaluate the choices against a multi-dimensional qualitative taxonomy and identify dimensions that distinguish between the discarded and added options. The module can revise the activity options being offered, for instance when the user choices satisfy a threshold along any of the identified dimensions.

Consider how choices might be presented on a tablet device to a user located in the North Beach neighborhood of San Francisco, as determined from location determining circuitry on the tablet device. In this example, it is 7:00 pm on a clear evening. The tablet user is looking for something to do. A variety of activity choices are presented by a user interaction module and displayed by the tablet hardware, one at a time. The first item displayed is a high-end Japanese restaurant. The user signals interest. The next two items also are Japanese restaurants, but both are more casual. The user signals that they are not interested. Using the multi-dimensional qualitative taxonomy or ontology, the system infers that the user wants more high-end activity options. It presents the next options consistent with the choices made so far and inferences drawn from the choices. The activity options presented will be biased toward more classy, less low-end, Japanese is good, but so are other restaurants that are classy. The next items presented are an Opera (user isn't interested), a high-end new American restaurant (user is interested), a Jazz concert (user is interested), and another high-end Japanese restaurant (the user is interested). Now the system has a stronger signal that the user wants high-end things to do that are music or food related, and a less distinct signal for high-end performances. The system responds by presenting more options that are high-end: three of the next few items are high-end bars (user is interested in 1 and not interested in 2), one item a classical concert (not interested), and five items are high-end restaurants (user is interested in 2 and rejects 3). Now the system has a large degree of confidence that the user wants high-end bars, restaurants, and some concerts that are most likely jazz performances.

FIG. 6 is a high level flow chart illustrating an example process for dynamic responding to user choices. Other embodiments may perform the steps in different orders and/or perform different or additional steps than the ones illustrated in FIG. 6. For convenience, FIG. 6 will be described with reference to a system of one or more computers that performs the process. The system can be, for example, the user interaction module of FIG. 5.

At step 610, the system receives a request for activity options with a location. The location may be read from the user computing device hardware or may have been selected explicitly by user. The system is aware of the time of day at the location received. Alternatively, the user may specify a future time. Optionally, the system may evaluate additional attributes 620 to be used when selecting initial activity options. The system presents or transmits initial options 630, which the user computing device 137 can display to the user. The system receives data representing choices made by the user or may receive inferences based on choices made by the user 640. As the system being described may be distributed between a user computing device 137 and the server, some analysis may be performed locally and summarize in data representing the results of analysis. The system applies a multidimensional qualitative taxonomy to selection additional activity options 650 that may interest the user. In one implementation, this involves identifying dimensions of consideration that the system can infer the user is applying, either positively or negatively. The activities accepted and rejected will each have multiple classifications, as illustrated in FIG. 4. Classifications that are common to multiple acceptances or rejections can be used to bias a presentation of additional activity options. For instance, a threshold of two, three or four acceptances or rejections that share a classification can be used to set the bias. Even a single acceptance or rejection can be used as a signal that an activity category or characteristic should be further explored. The additional activity options selected by the system are transmitted, responsive to choices received by the system 660.

Figure 7:
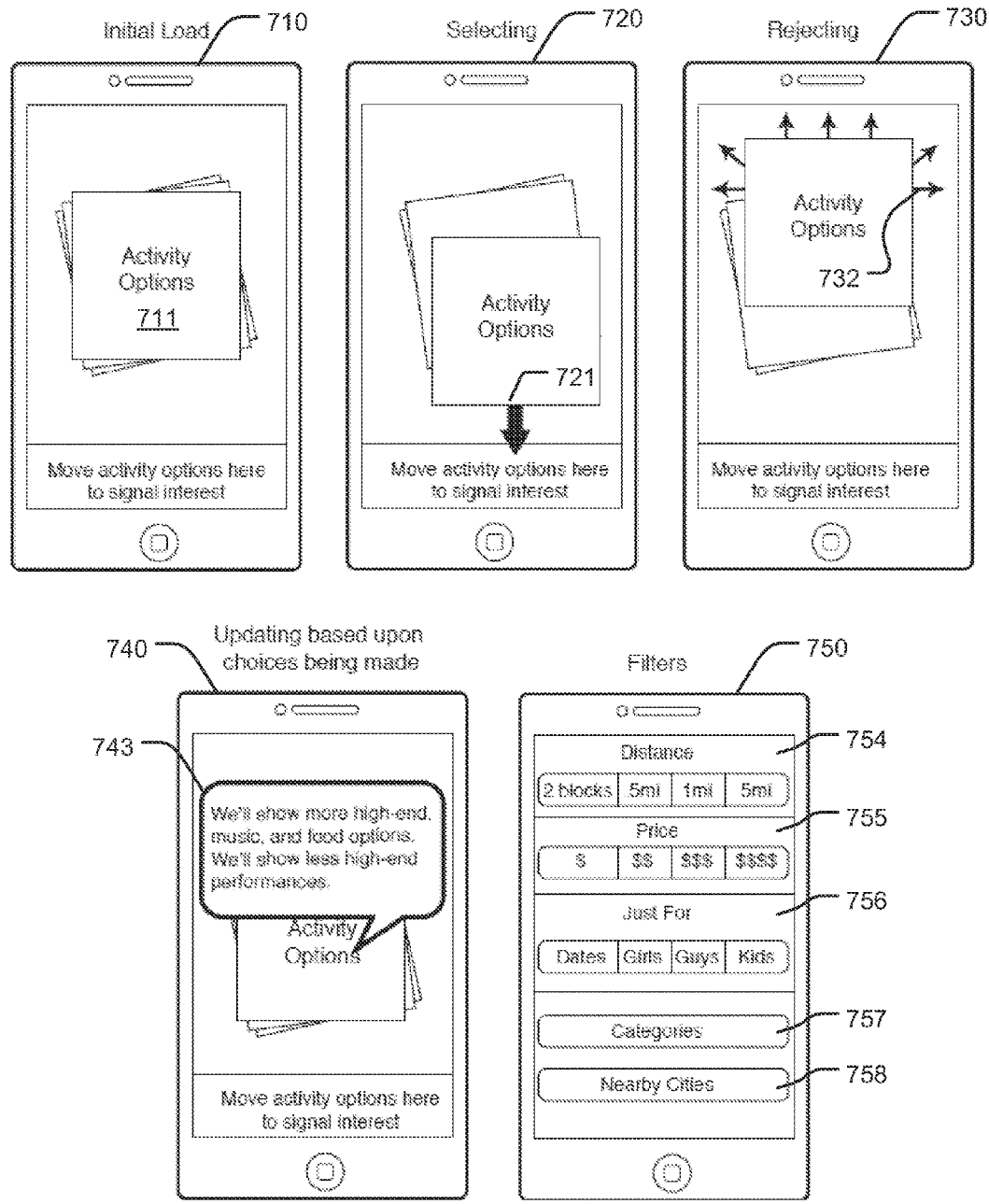
FIG. 7 is a series of GUI panels that illustrate an example interface for initial loading, selecting, rejecting and receiving activity options.

FIG. 7 is a series of GUI panels that illustrate an example interface for initial loading, selecting, rejecting and receiving activity options. Touchscreens on such mobile devices as smartphones and tablets provides means for dynamic user interaction with multiple degrees of freedom. A user may "touch" an object on the screen and move it using a gesture that indicates one of many desired actions in a single movement. One or more fingers can be used to fling, flick, swipe, drag, pinch, expand, or tap an object. The user may dynamically sort objects into multiple groups that can be analyzed to infer user preferences and/or desired actions.

In one implementation flinging, flicking, dragging or swiping gestures may be used to select an object and move it in a particular direction. The direction of movement acts as a choice or indication of the user's intent such as "I like this", "Add this to my wish list" or "Add this to the queue". For instance, flinging an object to the right 732 may cause the object to disappear from the screen and to be rejected. Flinging an object downward 721 may place the object in a collection, which may or may not be visible on the screen, of objects that the user wishes to retain for further use. Depending on the number of directions, any one of several choices may be made with one gesture. The user's choices can be analyzed characteristics of user preferences or choices inferred.

The user sorts screen objects 711 using gestures 721, 732. Characteristics of the objects selected, rejected or otherwise categorized can be analyzed in real time, while the user is making choices or performing sorting actions. For example, suppose the user is presented with a collection of several restaurants in a stack of images. Using gestures, the user can quickly accept restaurants options by moving them downward into a collection 721 or reject restaurants by moving their images to the right and off the screen 732. After one or more restaurants have been processed, the system analyzes characteristics of the user choices and uses its analysis to present more restaurants like those selected and/or fewer restaurants like those rejected. Alternatively, the system could present direct feedback, such as "More like this?", and elicit a user response, such as "yes" or "no."

In some implementations, an initial screen (not shown) notes starting conditions, such as a location and time and adds information looked up from an external source regarding the weather. This and other information can serve as context, when the application starts. After a short time (a few seconds) the context cloud disappears and the next screen 710 appears displaying a stack of activity items 711 to the user. In one implementation, this is a stack of labeled images of activity options.

The user moves an object from the top of the stack down 720, 721 to save/select it, or flings it to the side 730, 732 to reject it.

Screen 730 shows how an object may be "flung" off the screen to reject it and present the next object:

Screen 740 illustrates providing feedback to the user through a text bubble 743. The comments on this screen explain the real-time feedback process and the sorting process:

A question bubble (not shown) can be used to confirm feedback or request an explicit decision from the user.

Screen 750 illustrates how the user may filter activity options by indicating choices such as distance 754, price 755, "just for" 756, categories 757 or nearby cities 758. These filters can be applied initially, during sorting, or to organize display of sorted activity options.

Optionally, additional screens not shown here may allow the user to perform other types of selection, rejection, sorting and/or organizing a collection of objects using a gesture-based interface.

In addition to future activities, this style of interface can be used to rapidly survey other user attitudes, such as attitudes towards a candidate, political campaign or product advertising campaign. This style of interface could be used to choose specific clothing wardrobe images presented. In this case, the user may be presented with more than one place to which to move their selected clothing, e.g., "casual" and "formal," with rejects being flung off the screen. The objects displayed may represent anything tangible or intangible including but not limited to: restaurants in the local area, events on a given date, merchandise available for purchase, friends to invite to a party, ideas to include in a report, financial data to analyze, raw data such as baseball scores or stock prices, audio such as songs or sounds, video images and photos. For virtually any kind of image, a watch and infer module can harness the convenience and efficiency of a gesture-based interface to dynamically alter what is shown to the user, while the user makes choices.

Figure 19:
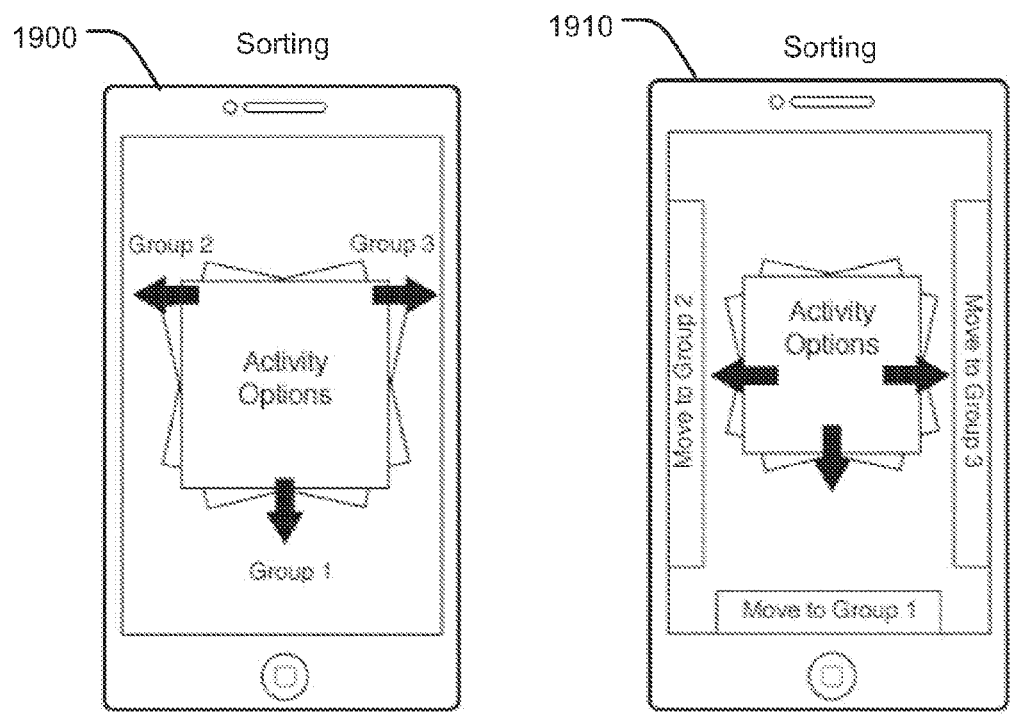
FIG. 19 is an example of two GUI panels that illustrate two interfaces for sorting activity options.

FIG. 19 shows two GUI panels that illustrate examples for sorting activity options in addition to the panels described above for FIG. 7, which, as indicated, may also be utilized to sort activity options.

Both panels shown in FIG. 19 are consistent with the GUI panels shown in FIG. 7, in which flinging, flicking, dragging or swiping gestures are used to sort an activity option by moving it in a particular direction. FIG. 7 illustrates sorting of activity options into two groups: selecting an activity option by moving it to a target area on the bottom of the screen 720, and rejecting an activity option by moving it to the sides or top of the screen 730. FIG. 19 illustrates how the user may sort objects into groups that can be analyzed to infer user preferences and/or desired actions as per the descriptive text for FIG. 7 above. The panel 1900 of FIG. 19 shows how activity options can be sorted into three groups by moving them in a particular direction. The panel 1910 shows how activity options can be sorted into three groups by moving them to one of three groups on the screen. In another embodiment using a similar implementation, it would be possible to sort activity options into more than three groups by increasing the number of directions that indicate groups or increasing the number of groups.

FIG. 8 is a block diagram of an example descriptive language module 800. This module can present activity options responsive to descriptive language criteria received from a user. Presenting activity options can involve identifying dimensions of consideration from semantic analysis of descriptive language criteria received and applying a multi-dimensional qualitative taxonomy along the identified dimensions to select a plurality of upcoming activities near a particular location in a particular time period responsive to the descriptive language.

In FIG. 8, the descriptive language module 800 includes a semantic analysis module 810, a dimensions of consideration module 820, a location and time filter module 830, a multi-dimension qualitative taxonomy analysis module 840 and a suggestion reporting module 850. Some implementations may have different and/or additional modules than those shown in FIG. 8. Moreover, the functionalities can be distributed among the modules in a different manner than described.

The semantic analysis module 810 applies natural language analysis technology to free-form input, whether spoken or typed. This natural language recognition may involve identification of parts of speech, canonical normalization and other techniques that generate phrases 453, 455, 457 they can be related to classifications 440. Structured input, such as selections from a list or from pulldown menus, can reduce or eliminate the need for semantic analysis by natural language recognition.

The dimensions of consideration module 820 treats classifications 440 as qualitative dimensions of consideration. In the descriptive language implementation, dimensions of and consideration are expressly specified. The dimensions of consideration module determines from the descriptive language which dimensions of consideration should be analyzed.

A location and time folder module 830 filters available activities. The available activities can be efficiently filtered by location and time before applying the dimensions of consideration. Alternatively, available activities could be filtered by dimensions of consideration, before being narrowed by location and time. As described above, location and time could be combined with other contacts or attributes to filter activity options before reporting.

The multi-dimension qualitative taxonomy analysis module 840 scores activity options along the dimensions of consideration. Once candidate activity options have been generated, this scoring can use characteristics shown in the similarity matrix in FIG. 2, with the heaviest weighting given to the characteristics that match the dimensions of consideration.

Suggestion reporting module 850 transmits, reports or persists at least some of the scored candidate activity options.

Figure 10:
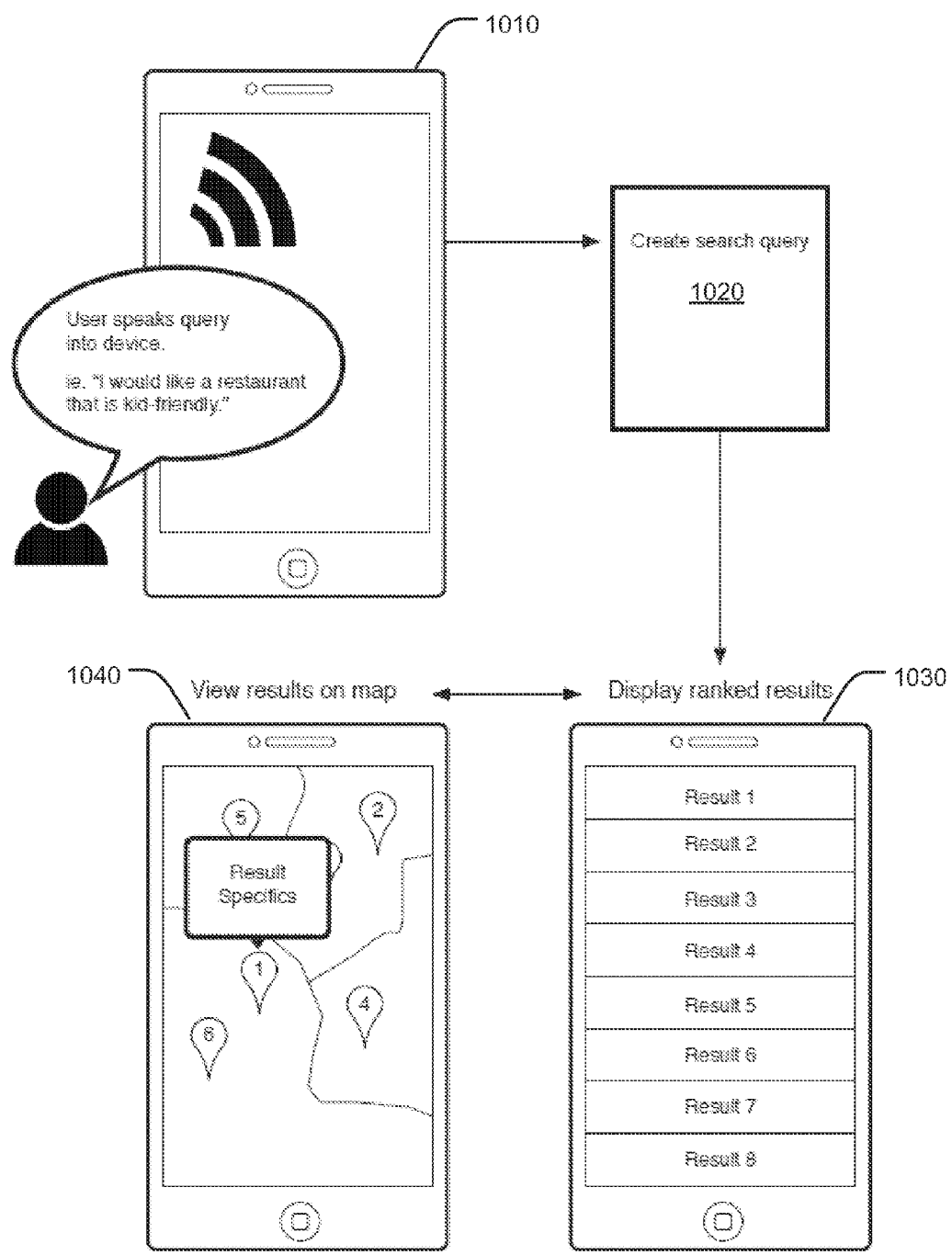
FIG. 10 is a series of GUI panels that illustrate an example interface for a user speaking to device, receiving suggestions, viewing a map of the suggestions.

A first example of using natural language recognition and a multi-dimensional taxonomy or ontology involves a user's desire for a kid-friendly place, expressed via a voice search, as illustrated in FIG. 10. The user tells the system 1010 something like: "I would like a restaurant that is kid-friendly" or "I am with my children and we want to eat." They could also say, "I want a place to take my kids" or "I am looking for a kid friendly activity." These phrases all are recognized 453 in the multi-dimensional taxonomy analysis of FIG. 4. The results for the first two queries will yield places that are good for kid-friendly dining like diners, pizza places, burgers, tacos, or ice cream & frozen yogurt shops. The second two queries would yield a wider set of results that include all of the above, but include multiple categories of upcoming kid-friendly activities like movies, performances, and concerts and attractions like parks, zoos, and attractions.

"I would like a restaurant that is kid-friendly"→"restaurant"+"kid-friendly"

"I am with my children and we want to eat"→"restaurant"+"kid-friendly"

"I want a place to take my kids"→"activity"+"kid-friendly"

"I am looking for a kid friendly activity"→"activity"+ "kid-friendly"

A multi-dimensional taxonomy covers categories of places, events, and activities by subject like restaurants, movies, performances, music, etc. It then has classifications of the same, such as whether it's classy, good for kids, romantic, etc. Categories of places and activities can have types, so the Restaurant category has types of Food such as American, Chinese, Japanese, while the Movies category has types such as Action, Horror, Romance. Within each dimension, the taxonomy contains many keywords and phrases that are used to determine the classification of a place/event/activity within the taxonomy, so "good for kids" and "kid-friendly" both classify a place or activity in the "kids" dimension. These keywords & phrases can also be weighted by sentiment, so for example "good for kids" is not as positive as "great for kids", so any activity that's "great for kids" would rank higher than "good for kids" for a kid-friendly query.

A second example involves retrieving activities within a geographic area that are available within a particular time period and that match the category of activity described, then scoring those activities by a relevance metric that incorporates how near the activity is to the user's location, public ratings of the activity, how well the activity matches the described mood/ambiance, if the activity has described features, and whether the activity is appropriate for the user based on their known demographic profile, preferences, and/or past activity history.

Consider, for instance, selecting an activity for a classy girls' night out or restaurant; in the San Francisco neighborhood known as the Marina. Suppose the user says, "I want to take my friends out to a classy restaurant with a fireplace". In this example, the user is an adult female who finds herself in the Marina on a Saturday night, and has previously been to Terzo, a restaurant that has a fireplace, a girls score=100/100, a classy score=100/100, and a rating=4/5.

The descriptive criteria tell us the user is looking for a classy restaurant. The system knows that the user is an adult female that is in the Marina neighborhood of San Francisco, based on a device location, a stored demographic profile, and/or manual input. The system infers that the user's friends are also adult female. It is Saturday night. The system translates what the user said into a search query to find restaurants in the Marina that are open on Saturday night. The search query returns places such as:
+Beteljuice: has a fireplace, girls score=100/100, classy score=70/100, rating=3.9/5
+Bistro ABC: no fireplace, girls score=70/100, classy score=60/100, rating=4/5
+Circa: no fireplace, girls score=80/100, classy score=70/100, rating=3.5/5
−Original Buffalo: no fireplace, girls score=0/100, classy score=0/100, rating=3/5
−Pizza Place: no fireplace, girls score=0/100, classy score=0/100, rating=3.5/5

We know these places are open on Saturday night and are in the Marina. In one implementation, the system extracts location and hours features from semi-structured data, either in advance or in response to the query.

A relevance metric can be calculated using an average of the normalized scores combined with a similarity score to previous places (in this case Terzo):
Beteljuice: (1+1+0.7+0.78)/4=0.87+0.8=1.67
Bistro ABC: (0+0.7+0.6+0.8)/4=0.5+0.6=1.1
Circa: (0+0.8+0.7+0.7)/4=0.55+0.7=1.25
Original Buffalo: (0+0+0+0.6)/4=0.15+0.1=0.25
Pizza Place: (0+0+0+0.7)/4=0.17+0.2=0.37

Using the calculated scores, these places can be ranked: Beteljuice, Circa, Bistro ABC, Pizza Place, then Original Buffalo.

The girls score and classy scores for the activity options can be determined using phrase extraction and classification of reviews, as well as feature extraction of semi-structured information collected about each place. The overall rating can be determined by combining public ratings with the sentiment of reviews, as well as public votes and/or likes. Whether a place has a fireplace can be determined using feature extraction of reviews and/or semi-structured data. The similarity to Terzo can be calculated using these and other dimensions, which can included other shared features, mood/ambiance scores, who/occasion scores, public ratings, and more, calculating a final similarity score using a metric such as Euclidean distance.

Figure 9:
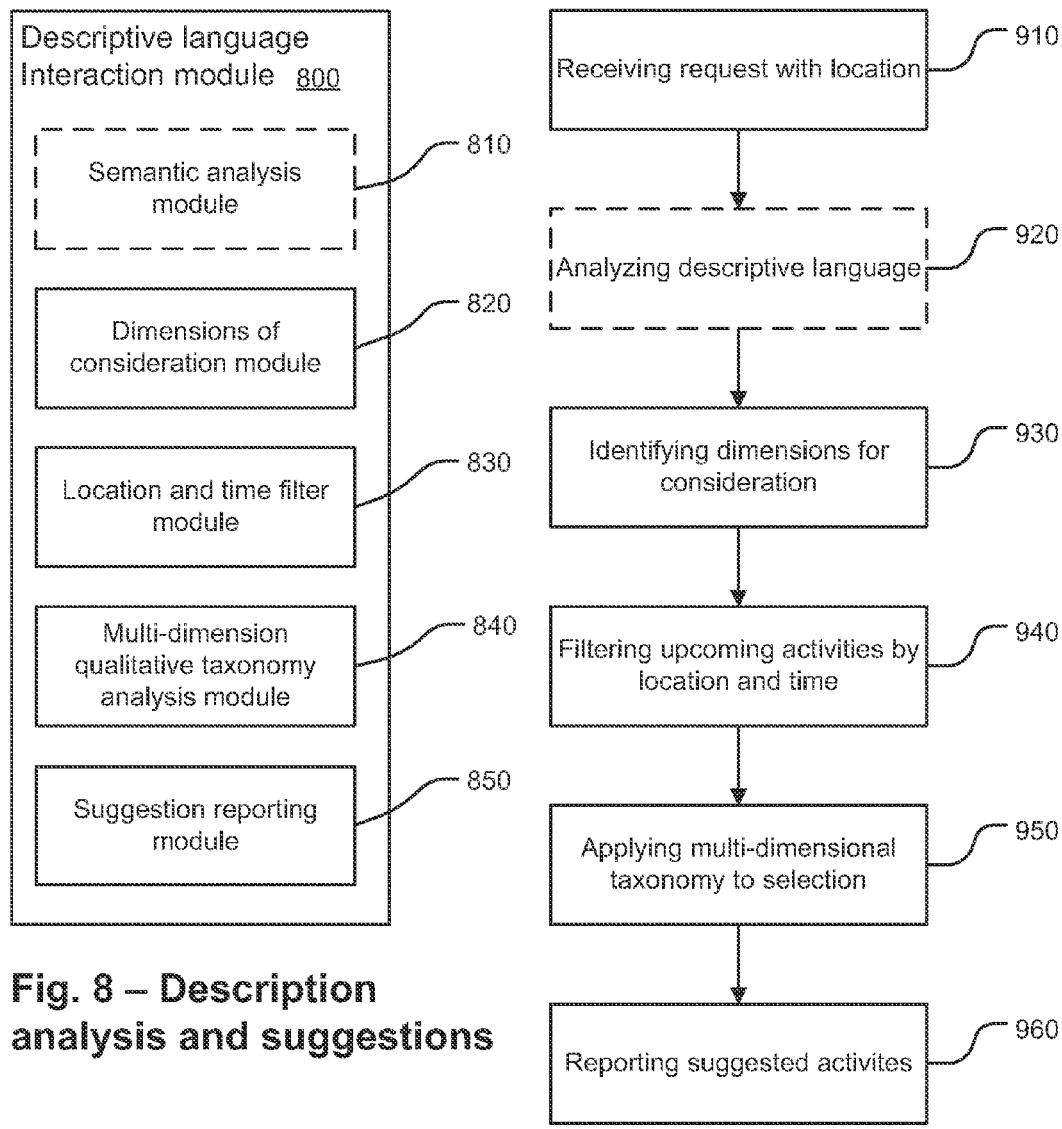
FIG. 9 is a high level flow chart of description analysis and suggestions.

FIG. 9 is a flow chart illustrating an example process for description analysis and activity option suggestions. Other embodiments may perform the steps in different orders and/or perform different or additional steps than the ones illustrated in FIG. 9. For convenience, FIG. 9 will be described with reference to a system of one or more computers that performs a process. The system can be, for example, the descriptive language interaction module 800 described above.

At step 910, the system receives a request with location information. The system knows the time of day at the reference location and may have additional attributes that can be used to select activity options.

At step 920, the system optionally analyzes descriptive language. Analysis is required when the descriptive language is unstructured, such as free-form text or spoken query.

At step 930, the system identifies dimensions for consideration of activity options. Phrases extracted from the descriptive language can be classified, for later use with a multidimensional qualitative taxonomy, as illustrated in FIG. 4 and explained above.

At step 940, the system filters upcoming activities by location, time and potentially by other attributes. This filtering can efficiently reduce the number of activity options to be scored and the amount of data to be retrieved.

At step 950, the system applies the multidimensional qualitative taxonomy along the identified dimensions for consideration. It scores a list of activity options.

At step 960, the system reports, transmits or persists suggested activities using at least the scores.

FIG. 10 is a series of GUI panels that illustrate an example interface for a user speaking to device 1010, creating a search query 1020, presenting activity options as ranked results 1030, viewing a map of the activity options 1040. The sequence of GUI panels illustrates a voice activated interaction between a user and a descriptive language interaction module.

Sometimes, the user wants more than a single activity option. There are many products, applications and Internet sites or services that provide listings and ratings for a single activity, such as eating at a restaurant. Popular sites in 2012 include Yelp, City Search, Google Places, Eventful, Rotten Tomatoes. These sites do not meet the need for a sequence of activities.

Many users are actually attempting to find a sequence of activities for an evening are other period of time. Users would like a plan that includes multiple activities from multiple categories. They wish to perform these activities sequentially such as going out to dinner, attending a concert and then relaxing in a club with friends. These users want a complete plan with multiple items, whether it be for a night out with friends or a Sunday afternoon outing with their family. This is what a personal concierge plan and itinerary generator provides.

FIG. 11 is a block diagram of an example of a sequence building module 1100. In FIG. 11, the sequence building module 1100 includes a location, mood and occasion collection module 1110, a location and time filter module 1120, a dimensions analysis module 1130, a multidimensional qualitative taxonomy analysis module 1140, a compatibility analysis module 1150, and a suggestion reporting module 1160. Some implementations may have different and/or additional modules than those shown in FIG. 11. Moreover, the functionalities can be distributed among the modules in a different manner than described.

The location, mood and occasion collection module 1110 receives data used as a starting point for a sampling a sequence of potential activities. These sequences are generally as discussed above in the context of FIG. 3. Collection of location data has been discussed above. Mood and occasion can be expressed free-form or by selection. By definition, mood denotes or describes the environmental factors that impact how a person may feel when in the environment, such as ambiance, dress code and noise level. Examples of mood descriptive language include casual, chill, hip, cozy, intimate, romantic, formal, trendy, informal, excited, relaxed, thoughtful, talkative, enthusiastic, and quiet. Mood describes the subjective or affective response of a person to the environment. It is a feeling word.

By definition, occasion describes one or more of the grouping size (small vs. large group), how group members are related (family vs. friends), and the purpose of the activity (date, hang out, business, party).

The location and time filter module 1120, the dimensions of analysis module 1130, and the multidimensional qualitative taxonomy analysis module 1140 operate as previously described in the context of FIG. 8.

The compatibility analysis module 1150 generally operates as illustrated by FIG. 3 and discussed above. This compatibility analysis module allows the activity option generating implementations described above to be extended to generation and scoring of activity sets. Sets of compatible activities are formulated and presented as units. The suggestion reporting module 1160 reports, transmits or persists at least some of the scored activity sets.

The sequence building module 1100 in this example is configured to recommend sequences of three or more upcoming activities. It begins with at least mood and occasion indicators and a geographic location. It selects anchor activities near the geographic location that are consistent with the mood indicator and not inconsistent with the occasion indicator. It identifies two or more compatible activities near the anchor activity. It can report availability and bookability of activities in the activity sets, or at least availability and/or bookability of the anchor activities in activity sets.

In one embodiment, a user's location may be inferred from an IP address or from information provided by the user (the user may change locations if desired). The user may then choose who they plan to go with (family, friends, business, date) and the vibe (i.e. a "mood" such as casual, class, local style, tourist). The user may then select the "generate" action and the system searches its database for items which satisfy the given criteria and combines them into plans which contain one or more items. Optionally, the plans may be based on one or more templates that may be pre-defined or user definable. An example of a three item template: dinner (item 1) followed by a movie (item 2) followed by dessert (item 3). Templates may have any number of items and need not be restricted to three.

Consider, for example, constructing an activity sequence responsive to the following criteria: location (New York, N.Y.), time of day (evening), who is going (a mixed group of friends), group size (10), and the desired mood (lively).

In step one, the system determines possible anchor activities that fit the group type and size, mood, and time of day anywhere in the city of New York like dinner at Gotham Steak House (lively, classy, good for groups), drinks at The Standard (trendy, lively, good for groups, and people watching) or the U2 concert at Radio City Music Hall (lively, good for groups).

In step two, the system determines compatible activities via a real-world occasion sequencer. The sequencer, as illustrated in FIG. 3, takes into account the need for the items to have the same characteristics even though they may belong to different categories, be within a reasonable distance from each of the selected anchor activity, and fit models of real-world behaviors, such as:
  A) dinner, drinks, and a movie
  B) drinks, dinner, a show
  C) breakfast, attraction, snack
  D) activity, lunch, movie So for this example, the candidate groups of activities would be:
  (1) Dinner at Gotham Steak House, drinks at Employees Only, a show at the Village Vanguard
  (2) Drinks at Employees Only, Dinner at Tao, a U2 concert at Radio City Music Hall, dinner at The Cafeteria
  (3) Drinks at Ajna Bar, WD-50, drinks at The Standard Generating sequences of activities from activity options can involve random combinations or combinations based on mathematical or logical rules. Candidate combinations can be limited to predetermined sequences or can be rejected if they fail to satisfy predetermined sequences. One embodiment uses mathematical and/or logical rules to select and combine individual items to satisfy the user's preference(s). For instance an item such as a restaurant may be selected by a rule based on location, type of food and price. Another embodiment combines items randomly or uses default preferences, although the results may not necessarily correlate to the user's preference(s) as closely, but in some cases this may be in accordance with the user's desires.

In step three, the system sorts results by how well the collective group fits the user's needs.
  Group (1) has a collective value of 80/100 for all the desired characteristics above
  Group (2) has a collective value of 90/100 for all the desired characteristics above
  Group (3) has a collective value of 75/100 for all the desired characteristics above In step four, the system evaluates and filters activity sequences within the desired time window. Following this example:
  There is a table open at WD-50 that can accommodate the group.
  Gotham Steak House has a table, but not within the desired time window so its score decreases, lowering the score of the group it is associated with.
  Tao has tables available towards the end of the window, so it is lowered a little bit.

There are tickets to the U2 concert so it gets a bump up in score.

All the bars can accommodate the group size well and are first come, first serve so nothing changes here In step five, the system presents results. The results may be ordered by a calculated score. Presenting the results may involve transmitting or persisting the results. Typically, it involves presenting the results to hardware and software of the user computing device 137 for display to the user.

Links to places, events, other activities and/or associated vendors (e.g., StubHub, Open Table) may be provided to make it more convenient for a user to make reservations, purchase tickets, etc. The availability of reservations, tickets, etc. for items such as places and/or events may be factored into the process so that the user is only offered items that are available. Optionally, the "take rate" of items can be measured so that the items which are most popular are offered more frequently and those that are passed over are offered less frequently.

Figure 12:
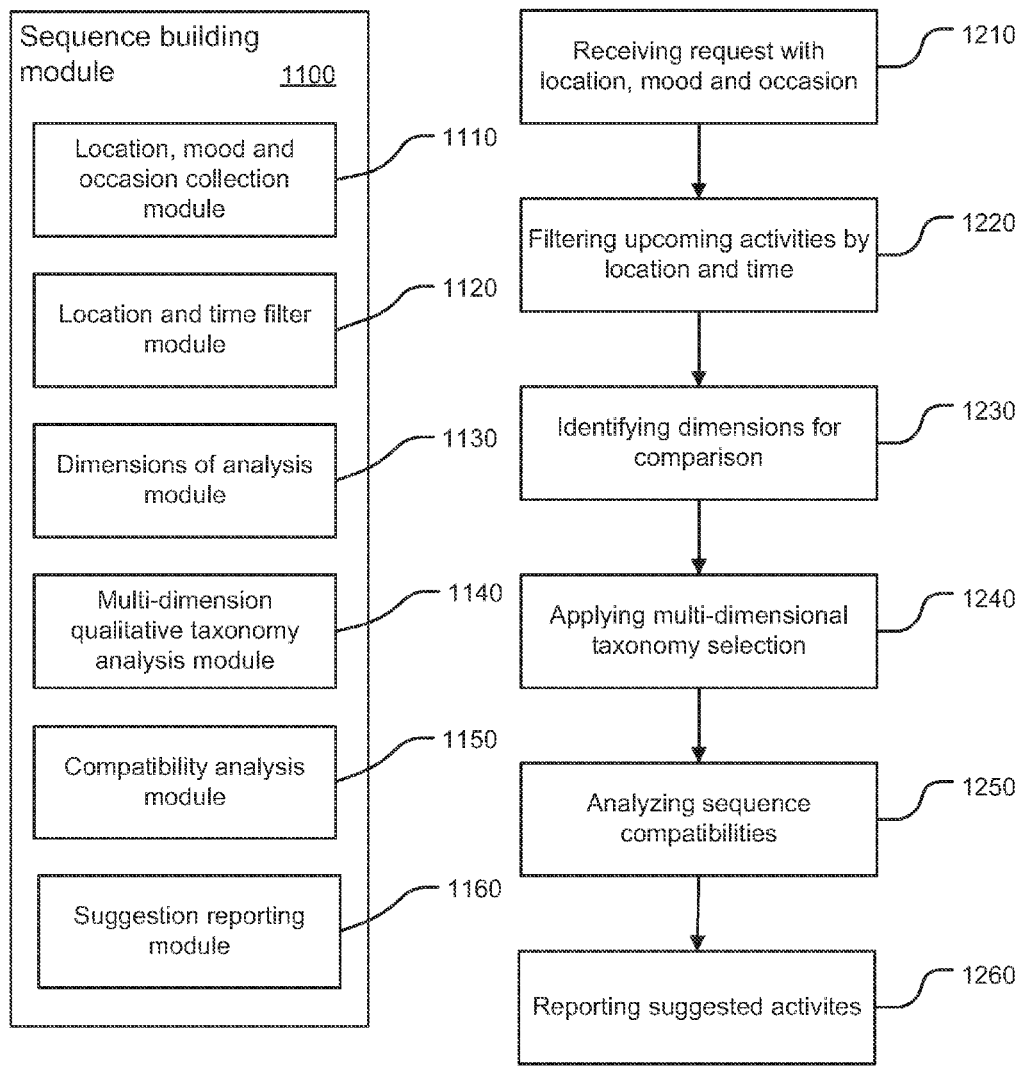
FIG. 12 is a high level flow chart of building a sequence of activities in a day.

FIG. 12 is a high level flow chart of building a sequence of activities in a day. The steps in this flow, 1210-1260, involve activities that parallel the modules with similar numbers, 1110-1160.

Figure 13:
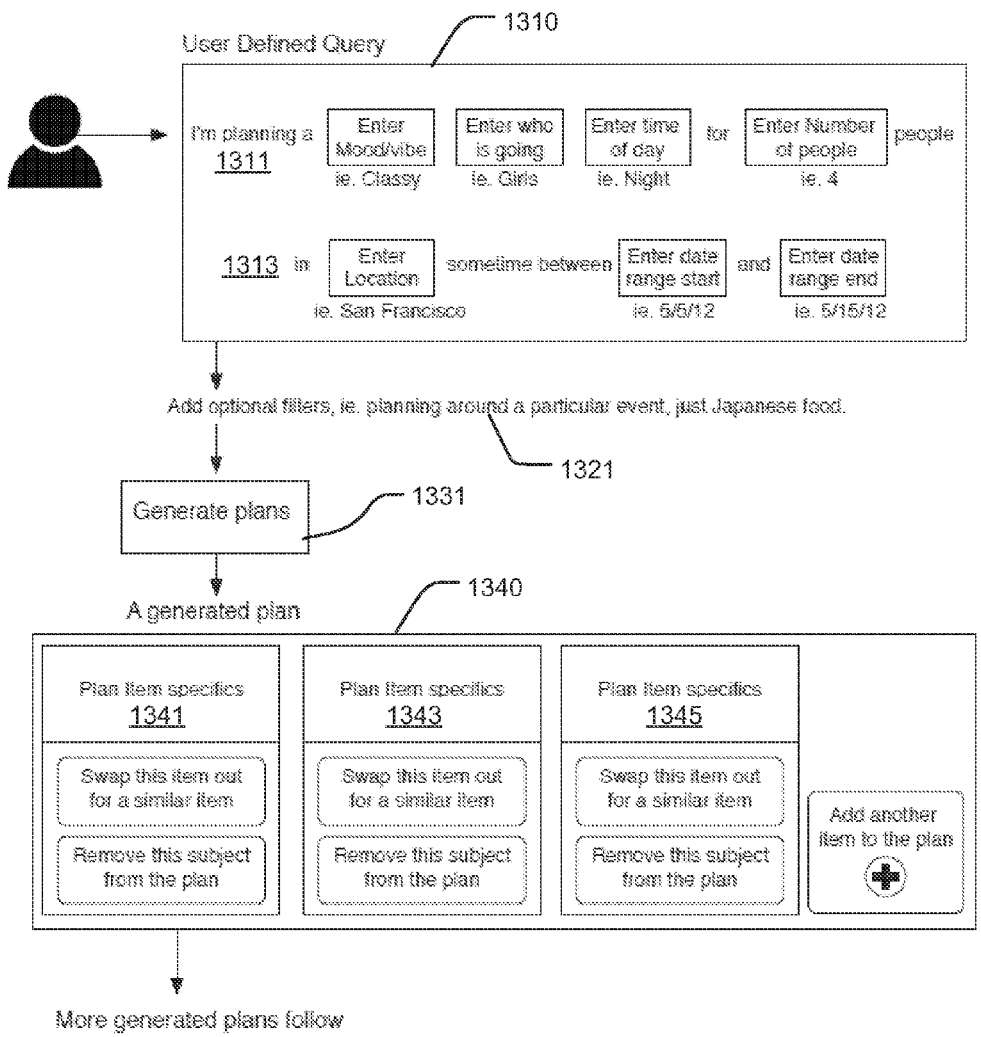
FIGS. 13-14 illustrate generating a plan with a sequence of three activities and extending the planning to three or more activities in each of five days.
Figure 14:
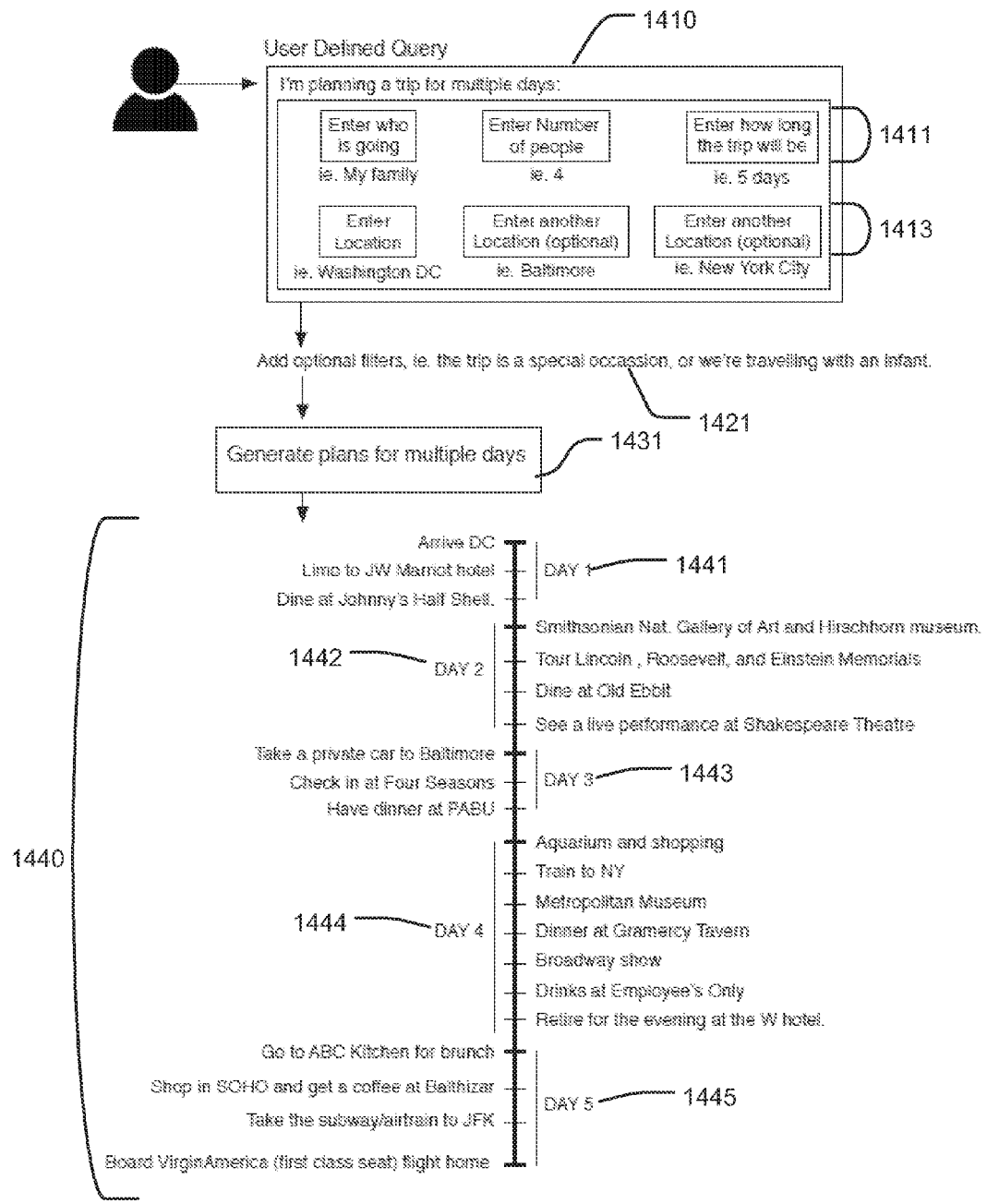

FIGS. 13-14 illustrate an example of generating a plan with a sequence of three activities and extending the planning to three or more activities in each of five days.

A user can begin generating a sequence of activities at an initial screen 1310 that requires relatively little information. For a single day sequence, the user need only choose the type of plan, the vibe (mood) and press the "Generate plans" button 1331. For single day, a default location may be inferred from an IP address, a device location or other information provided by the user. Additional information provided can be used to set filters that focus the sequence generation 1321. The user can provide desired attributes 1311 such as mood/vibe, who is going, time of day and number of people. The user can provide 1313 the location and a date or date range for future activities.

In one example of single day planning, the screen shows results obtained from searching the database and combining items according to a user's previous or default selections. In this example, three alternative sequences each include three items. The second plan includes, "Go see Jersey Boys . . . ". In sequence, the plan involves dinner at Stecchino, followed by the main event, Jersey Boys at the August Wilson Theatre and finishing the evening at the Ayza Wine and Chocolate Bar. In order to create this plan, the system used the user's preferences to query the database for items that would satisfy them and that are located within 1 mile of each other. This produced a list of items suitable for combining into complete plans. A plan template containing three items (dinner, concert, dessert) was used to select from the item list an appropriate item for each item type: Stecchino satisfied the "dinner" item type, Jersey Boys satisfied the "concert" item type and Ayza satisfied the "dessert" item type. The inverted "teardrop" flags (located on the map) are numbered "1", "2", "3" to indicate the order of activities. Additional filters are provided on the left side to help the user narrow their choices. Clicking on the "See plan details" button displays another screen which is shown following the one below.

Alternative options may allow the user to specify such other preferences as: total travel time, total travel distance, total expected cost, crowded or secluded locales, noisy or quiet venues, maximize rewards such loyalty points or coupon credits, etc.

Clicking on a "See Plan details" button displays a screen which shows a larger map and information and/or review excerpts about each item. The user may press a button "Make a Facebook Event" to share the plan with friends and/or associates by creating a Facebook event. This is an example of how a user may coordinate an event with multiple users. This screen also illustrates how a user may modify the time of the event by clicking on the "do later" or "do earlier" actions. The user may click on "see similar restaurants" to choose a different restaurant.

Optionally, additional screens may allow the user to modify 1341, 1343, 1345 other aspects of a plan and then coordinate it with one or more of their friends or associates via a social networking service such as Facebook. Email is another option as are other social networking services like Twitter. Another option would allow the recipients of plans to modify them and make the modified version available to one or more of the original recipients. In one embodiment the user may choose to make a modified version available to one or more original recipients immediately upon modification. New recipients could also be included. There are many variations on this concept which will be obvious to one of ordinary skill in the art. An important aspect is the ability to use electronic, i.e., computer-based systems and networks to collect, classify and combine individual items culled from a network such as the Internet into activity plans that satisfy user preference(s).

The technology disclosed can, in some implementations, generate activity plans for one or more users by combining multiple items. The items may be places (such as restaurants or museums), events (such as concerts), other activities (such as shopping, golfing, boating or hiking) or anything else of possible interest. Items are selected, suggested and/or recommended for users based on a preference. A preference may be a combination of one or more of the following: location, type of food, venue, mood, date or any other relevant attribute or indicator which may be applied to items. A default preference may be provided or a user may provide their own. Alternatively, a user may start with a default preference and modify it. Another approach is to allow the user to specify one or more specific items around which plans are to be generated: these specific items may be retained and other items may be selected to form complete plans.

Itineraries may be created for an activity plan. An itinerary may contain date and time, location information for an item, a map showing the locations, suggested routes and/or order of visiting locations.

The user may coordinate their plans with other users by sharing them online (for example via the Internet) with one or more other users via email, Facebook, Twitter, LinkedIn, etc. This will allow users to collaborate on a plan that best satisfies their individual and collective desires. In some cases, it is reasonable to allow one user to modify a plan generated by another user.

FIG. 14 is a block diagram of an example generating plans from a user query for more than one day. Parts of the set-up process 1410 such as who is going and the party size 1411 and a first location 1413 are the same for a multi-day sequence as for one day. Other parts, such as the length of the trip in days 1411 and multiple locations 1413 are extensions of one day activity sequence planning.

The multi-day sequence generator begins, as with the single day planner, with at least mood and occasion indicators and one or more geographic locations to be included. It involves selecting at least one anchor activity near each specified geographic location. The anchor activity is consistent with the mood and not inconsistent with the occasion. Extending the single day planner, multi-day and multi-location planning includes identifying one or more compatible means of conveyance and/or routes within or between the one or more locations. It can involve identifying one or more compatible activities near the anchor activities. It can involve reporting availability and bookable of activity sets, of the anchor activities, of the conveyance and of the compatible activities.

Consider an example of a sequence involving multiple locations 1440. Suppose that the user is in DC, going to Baltimore, then New York, over the course of 3 days. The user stays at high end hotels and wants cultural activities such as museums and live performances. The system can chose the carrier or conveyance, such as a private car, stretch limo, bus or train, as part of an overall experience.

A multi-day plan 1440 emerges from a series of plans for individual days, as follows:

1) Arrive in DC late afternoon 1441, take limo to JW Marriot hotel. Dine at Johnny's Half Shell.
2) Spend next morning at Smithsonian Nat. Gallery of Art and Hirschhorn Museum 1442. Now have an afternoon limo tour then to Lincoln Memorial, Roosevelt Memorial, Einstein Memorial. Early dinner at the Old Ebbit Grill then live performance at Shakespeare Theatre.
3) Next day after a relaxing morning at the hotel spa, hire a private car to Baltimore 1443 and arrive mid afternoon, stay in Four Seasons hotel and have dinner at PABU.
4) Spend the next morning at the Aquarium and shopping 1444. Take the train from Baltimore to NY and arrive mid afternoon. Visit the Metropolitan Museum, have a quick dinner at Gramercy Tavern, take in a Broadway show, and get drinks at Employee's Only. Retire for the evening at the W hotel.
5) Wake the next morning and go to ABC Kitchen for brunch 1445, shop in SOHO, and get a coffee at Balthazar before taking the subway/airtrain to JFK and board a Virgin America (first class seat) flight home.

This multi-day itinerary was planned to satisfy the mood "classy", with the main attribute of "cultural", the "event type" as "live performance", the 3 given locations and the dates. For each location, the system generated activity options appropriate to the time of day (morning, midday, evening) and grouped them by category: food, museums, performances, transportation. The system chose an appropriate anchor item (usually the activity of longest duration) for each time of day and selected high scoring items (in the mood and main attribute) to accompany it (based on "classiness" and "cultural" scores) from each category that had availability (tickets, reservations, hours of operation) and location proximity, if applicable.

Here is a sample that shows a variety of how individual items would score in order to create an initial list from which to choose:

Museums:

Smithsonian—Nat. Gallery of Art:
 classy score=90%; cultural score=90%; proximity=90%
Smithsonian—Hirschorn Museum:
 classy score=90%; cultural score=90%; proximity=80%
Smithsonian—Air Museum:
 classy score=70%; cultural score=70%; proximity=70%
Metropolitan Museum of Art:
 classy score=90%; cultural score=90%; proximity=70%
Performances:
On Broadway:
 classy score=90%, cultural score=<depends on the show>,
 availability=80%
Shakespeare theatre:
 classy score=80%, cultural score=80%, availability=90%
Metropolitan Opera:
 classy score=90%, cultural score=90%, availability=70%
Restaurants:
 Gramercy Tavern: classy score=80%, availability=80%
 Balthazar: classy score=90%, availability=90%
 Johnny's Half Shell: classy score=90%, availability=70%
 Old Ebbit Grill: classy score=80%, availability=70%
Accommodations:
 Four Seasons: classy score=90%, proximity=80%
 JW Marriot: classy score=90%, proximity=80%
 W Midtown: classy score=90%, proximity=80%
Local attractions:
 Lincoln Memorial: classy score=90%, cultural score=90%
 Roosevelt Memorial: classy score=90%, cultural score=90%
 Einstein Memorial: classy score=90%, cultural score=90%
 Statue of Liberty: classy score=90%, cultural score=90%
Transportation:
 Private car (drive yourself): classy score=80%
 Limo or private car w/driver: classy score=90%
 Train: classy score=80% if first class
 Bus: classy score=50%
 Airlines—Virgin America: classy score=80%

The plan modification interface 1340 can be particularly helpful for an extended itinerary and options such as these.

Generating a multi-day itinerary presents opportunities for facilitating purchases and for high value targeted advertising.

Knowing a user's preference(s) and/or plan history may allow searches for travel related items. Example: if a user repeatedly selects a particular type of musical concert, links to purchase a performer's music and similar music may be provided. Optionally, the music may be purchased directly from the product site.

When a user makes reservations or purchases tickets either directly or via a link, a portion of the purchase price may be credited to the site or organization responsible for presenting the link.

So-called "last minute" or "rush" events can be targeted at a discount to users that have shown a preference for those particular events. Likewise a user who has shown a preference for a particular restaurant may be advised that special reservations (for a group or "last minute") are available, possibly at a discount.

A user's preference(s) may be used to select and/or display related merchandise such as golf clothing and accessories for a user who has shown an interest in golf-related activities.

A further possibility is to aggregate user preference(s) and/or attributes of chosen plans. This information may be analyzed and sold to vendors who are in the associated markets so that they can see what their customers prefer and where they need to make changes in their product/service mix.

Another implementation would enable vendors to offer tickets, reservations and/or similar items to users. These offerings may be based on their preference(s) and/or plan history. Also, vendors may be able to offer significant discounts on these items. In some cases the discounts may be offered under special conditions: for instance a vendor may offer a substantially reduced price on concert tickets if a user purchases ten or more.

In another embodiment an API may be provided to allow developers to access the product functionality and integrate it into their products. An example would be for a social networking site or vendors of event tickets to use the API to find plans based around their events and/or user information and offer the plans to users.

Yet other embodiments may offer additional functionality:

1. Special features of an item could be included in the classification rules to allow more focused results for the user. Examples may include restaurants that offer banquet facilities or have a scenic view, events, places and other activities that are "kid friendly." In some cases, the user may have additional preferences that correspond to these special features.

2. A user's "social graph" (i.e., a list of their known friends and associates) could be used to collect additional information such as shared preferences. Also, the social graph would enable collaborative filtering that would, for example, yield plans that would most likely be of interest to all the users in a collaborative group.

3. Plans could be published to social media sites such as Facebook, Twitter or blog sites.

4. Location enabled devices could provide the ability to allow "spontaneous" plan generation based on the user's current location. Alternatively, the user may specify their current location, for example, via a user interface on the device.

5. Users could be notified well in advance of upcoming events that may be of interest to them based on their past plans and/or preferences, or based on the user's specifically requesting to be notified of any events for a particular performer, group, exhibit, presentation, etc.

Another implementation of the technology disclosed builds activity options from samples of preferred activities. For instance, a system can make recommendations based on five restaurants my wife likes.

In one implementation, a user shares 30 or so restaurants, bars, coffee shops, movies, and events they enjoy. The system applies the multi-dimensional taxonomy and determines how highly rated the shared locations and activities are, what their mood and occasion mappings are, and their similarity to other activities the user could potentially do in the future.

The resulting profile we learn about the user is something like what follows:

Subjects of interest: Food, Movies, Coffee & Sweets, Drinks & nightlife, movies, events.
Types of Movies: Romantic, Comedy, Drama.
Types of Food: American, Italian, Greek, Chinese, Ice Cream & Frozen Yogurt.
Types of Drinks & nightlife: bars, hotel bars, lounges.
Types of Events: rock and jazz concerts.
Neighborhoods: 3 known neighborhoods they frequent (based on place and event addresses).
Most of the places they frequent are: classy, hip, lively places, and sometimes casual.
Most of the places they frequent are good for: dating, large groups and groups of girls.
The average price level they desire is: $$$.

Figure 16:
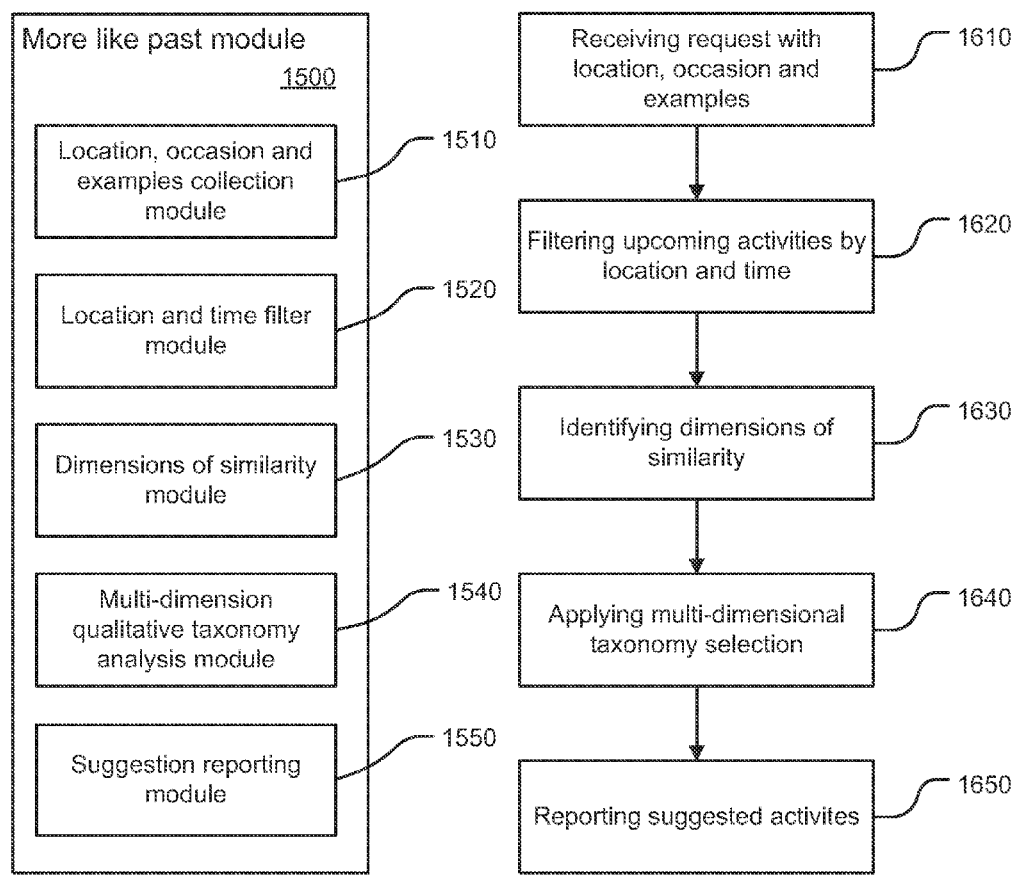
FIG. 16 is a high level flow chart of receiving and processing past activity examples with query parameters.
Figure 17:
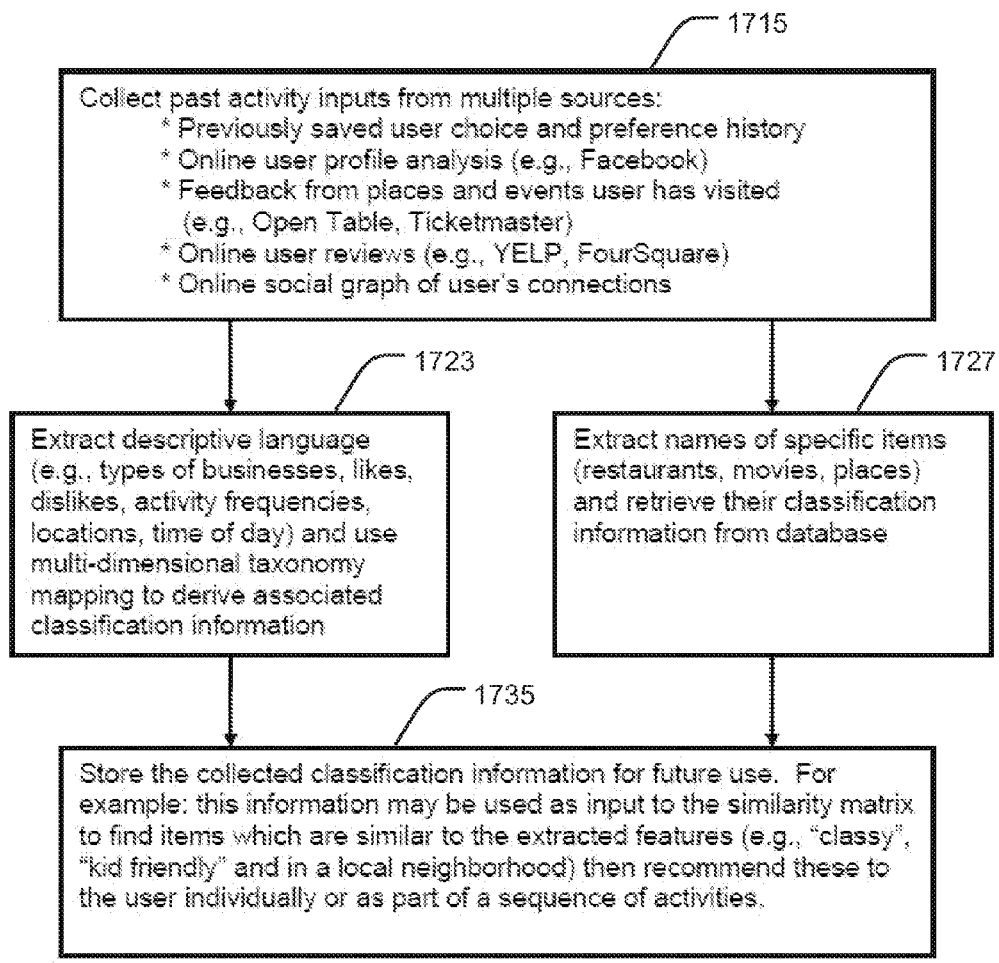
FIG. 17 is a block diagram of receiving and processing past activity examples with query parameters.

Using this profile, the system can find places and activities and generate a personalized score for those places and activities. The system can rank the new places and activities by how similar they are to specified places or previously visited places. FIGS. 15-17 illustrate examples of technology useful for identifying more future activity options based on identified past activity examples.

FIG. 15 is a block diagram of an example of a module 1500 that accepts past activity examples with query parameters. In FIG. 15, the more-like-past module 1500 includes a number of submodules: a location, occasion and examples collection module 1510; a location and time filter module 1520; the dimensions of similarity module 1530; a multi-dimension qualitative taxonomy analysis module 1540 and the suggestion reporting module 1550. Some implementations may have different and/or additional modules and not shown in FIG. 15. Moreover, the functionalities can be distributed among the modules in a different manner than described.

Modules 1520-1550 generally correspond to modules of the same name 820-850 in FIG. 8.

Module 1510 collects examples data, in addition to the location and occasion data collected by similar modules described above. Past activity inputs can be collected from multiple sources, as explained in FIG. 17. The multiple sources 1715 can include previously saved user choice and preference history, online user profile analysis, feedback from places and events the users visited, online user contributed reviews, and social graph of the users online connections to other people. This module 1510 is responsible for aggregating the examples, as described in FIG. 17.

FIG. 16 is a flowchart illustrating an example process for accepting past activity examples and responding with activity options. Other embodiments may perform the steps different orders and/or form different or additional steps than the ones illustrated in FIG. 16. For convenience, FIG. 16 would be described with reference to the system of one or more computers that perform the process. The system can be, for example, the more like past module 1500 of FIG. 15.

The flow steps 1610-1650 correspond to the module components 1510-1550.

FIG. 17 is a block diagram of receiving and processing past activity examples with query parameters. Other embodiments may perform the steps in different orders and/or form different or additional steps than the ones illustrated in FIG. 17. For convenience, FIG. 17 would be described with reference to the system of one or more computers that perform the process.

At step 1715, the system collects past activity inputs from multiple sources. One multiple source is previously saved user choices and/or a user preference history. Another source is analysis of an online user profile for another service such as Facebook. Past activity can be collected directly from places advanced users visited, such as open table or Ticketmaster, with the user's activity inputs from an extended group can be obtained using a social graph of the user's online connections. From one or more of these sources or from direct user input, a plurality of past activities can be identified.

The collected past activity 1715 can be analyzed either on the basis of descriptive language 1723 or extracted names 1727. Descriptive language can be extracted 1723 from the sources of past activity inputs. Descriptive language includes business type, posted likes and dislikes of the business, activity frequencies for visits to the comments on the business, locations and time of day that the business was visit. Extracted descriptive language can be used with a multidimensional taxonomy mapping of FIG. 4 to derive associated classification information. Names also can be extracted 1727. Classifications of specific items or activities can be retrieved from a database such as the similarity matrix FIG. 2 or the multidimensional taxonomy mapping FIG. 4.

Collected classification information 1735 can be stored for future use. For example, classification information may be used as input to the similarity matrix to find items that are similar to the extracted features. Then, classy, kid friendly or local neighborhood activities can be identified and recommended to a particular user or used as part of a sequence of activities.

In general, past activities mapping can lead into the similarity analysis, activity options, activity sequences, or multi-day activity sequences.

Figure 18:
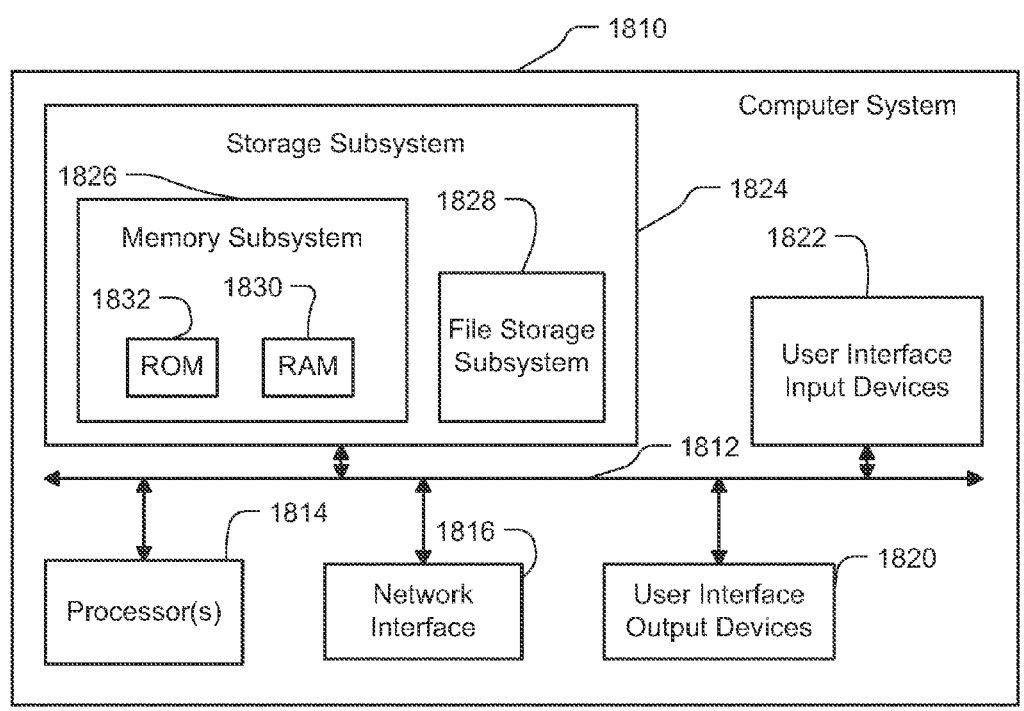
FIG. 18 is a block diagram of an example computer system.

FIG. 18 is a block diagram of an example computer system, according to one implementation. Computer system 1810 typically includes at least one processor 1814 which communicates with a number of peripheral devices via bus subsystem 1812. These peripheral devices may include a storage subsystem 1824 including, for example, memory devices and a file storage subsystem, user interface input devices 1822, user interface output devices 1820, and a network interface subsystem 1816. The input and output devices allow user interaction with computer system 1810. Network interface subsystem 1816 provides an interface to outside networks, including an interface to communication network 125, and is coupled via communication network 125 to corresponding interface devices in other computer systems.

User interface input devices 1822 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1810 or onto communication network 125.

User interface output devices 1820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as via audio output devices. In general, use of the term "output device" is intended to include all possible types of devices and ways to output information from computer system 1810 to the user or to another machine or computer system.

Storage subsystem 1824 stores programming and data constructs that provide the functionality of some or all of the modules and methods described herein. These software modules are generally executed by processor 1814 alone or in combination with other processors.

Memory 1826 used in the storage subsystem can include a number of memories including a main random access memory (RAM) 1830 for storage of instructions and data during program execution and a read only memory (ROM) 1832 in which fixed instructions are stored. A file storage subsystem 1828 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1828 in the storage subsystem 1824, or in other machines accessible by the processor.

Bus subsystem 1812 provides a mechanism for letting the various components and subsystems of computer system 1810 communicate with each other as intended. Although bus subsystem 1812 is shown schematically as a single bus, alternative implementations of the bus subsystem may use multiple busses.

Computer system 1810 can be of varying types including a workstation, server, computing cluster, blade server, server farm, or any other data processing system or computing device. Due to the ever-changing nature of computers and networks, the description of computer system 1810 depicted in FIG. 18 is intended only as one example. Many other configurations of computer system 1810 are possible having more or fewer components than the computer system depicted in FIG. 18.

Some Particular Embodiments

In one implementation, a method is described for determining and responding to a user's response to choices presented as images on the touch screen. The method includes receiving input reporting a user gesture that indicates a direction of movement of an image from an activity area of the screen and determining from the direction of the movement a user's intent to save or discard the image. It further includes using the user's intent to determine subsequent images to display in the activity area.

This method and other implementations of the technology disclosed can each optionally include one or more of the following features and/or features described in connection with additional methods disclosed.

The method can include repeating the receiving, determining and using actions at least four times and using accumulation of the user's intent to determine a question for the user. It then includes sending the question for display to the user and using the user's response to determine subsequent images to display in the activity area.

It can include determining from the direction of the movement a user's intent to sort the image into one of multiple groups.

The gesture can be one of flinging, flicking, swiping, rotating and dragging.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In one implementation, a method is described that includes receiving at least first and second items that are real-world places, services or upcoming events. The method further includes retrieving from storage a plurality of characteristics of the first and second items, including at least the characteristics including how good each item is for an item category, particular subject/type, occasion, group of people, mood, and time of day. The method can further include scoring similarity of the first and second items based on similarity of the characteristics.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The method can further include scoring how good items are for one or more of the item category, particular occasion, group of people, mood and time of day based on customer sentiment. It can include scoring how good items are for the item category combined with at least the group of people based on mapping of customer frequency for customers similar to the group of people. And/or, it can include scoring how good items are for the item category combined with at least the group of people based on customer review analysis. In this context, customer sentiment is positive or negative; possibly neutral. Customer review analysis can be more qualitative, including extracting descriptive terms from reviews or customer comments. Scoring also can be based on customer ratings, such as a number of stars or a numerical score on a scale.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In another implementation, a method is described of presenting future activity options responsive to ongoing user choices. This method can include presenting initial activity options near a geographic location. It can further include receiving data representing user choices that discard or accept the options presented and evaluating the user choices against a multi-dimensional qualitative taxonomy and identifying dimensions that distinguish between the discarded options and the accepted options. The method can further include presenting additional activity options responsive to the identified dimensions as data representing additional user choices is received.

This method and other implementations of the technology disclosed can each optionally include one or more additional features described.

The method can further include repeating the evaluating and presenting actions two or more times as the data representing user choices is received.

It can further include limiting the initial options presented to be consistent with one or more filter criteria in addition to the geographic location. The filter criteria can be chosen based on history of a particular user's choices of activity options. The filter criteria can be chosen based on history of a particular user's purchase. The filter criteria can be chosen based on history of a particular user's location visits. The filter criteria can be price. The filter criteria can be a group of people participating in the future activity. The filter criteria can be a future activity category. The future activity category can be one of attractions, coffee and sweets, drinks and nightlife, food, movies, music, performances and sporting events. The future activity category can be chosen from a group that offers selection among at least attractions, coffee, drinks, food, movies, music, and performances.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In another implementation, a method is described of presenting activity options in response to descriptive language criteria received. This method can include receiving a particular location, receiving descriptive language criteria for a future activity, and identifying dimensions of consideration from automated semantic analysis of the descriptive language. It can further include applying a multi-dimensional qualitative taxonomy along the identified dimensions to score a plurality of future activities near the particular location in a particular time period responsive to the descriptive language.

This method and other implementations of the technology disclosed can each optionally include one or more additional features described.

The particular time period can be inferred from when the descriptive language criteria are received. The particular time period can be determined by the semantic analysis of the descriptive language criteria. The particular time period can be received from location identifying circuitry. The particular time period can be received as an explicit choice.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In another implementation, a method is described of presenting activity options in response to descriptive language criteria received. The method can include receiving a particular location, receiving descriptive language criteria for a future activity, and retrieving future activities near the particular location that are available within a particular time period and that match a category of activity described. The method can further include scoring the retrieved activities using a relevance metric that incorporates at least how near the activity is to the particular location, public ratings of the activity, and how well the activity matches a described mood/ambiance, if the mood/ambiance is described. It can further include transmitting at least some of the scored activities.

This method and other implementations of the technology disclosed can each optionally include one or more additional features described.

It can further include limiting the ranked activities returned based on analysis of a user's demographic profile. It can further include limiting the ranked activities returned based on analysis of a user's preferences. It can further include limiting the ranked activities returned based on analysis of a user's past activity history.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In another implementation, a method is described of recommending a sequence of three or more future activities. This method can include receiving at least mood and occasion indicators and a geographic location for a future activity. It can include selecting a plurality of anchor activities near the geographic location that are consistent with the mood and not inconsistent with the occasion. For each anchor activity, identifying two or more compatible activities near the anchor activity during a time period that includes the anchor activity. It can include scoring activity sets that include the anchor and compatible activities and reporting at least some of the scored activity sets.

This method and other implementations of the technology disclosed can each optionally include one or more additional features described.

It can further include receiving data representing user choices that discard or accept the activity sets and evaluating the user choices against a multi-dimensional qualitative taxonomy and identifying dimensions that distinguish between the discarded activity sets and the accepted activity sets. It can further include presenting additional activity sets responsive to the identified dimensions as data representing additional user choices is received. Or, the discarded and accepted anchor activities can be evaluated instead of activity sets. Or, the discarded and accepted compatible activities can be evaluated instead of activity sets.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In another implementation, a method is described of recommending sequences of three or more future activities at each of two or more geographic locations. This method can include receiving at least mood and occasion indicators and two or more geographic locations. For each geographic location, selecting a plurality of anchor activities near the geographic location that are consistent with the mood and not inconsistent with the occasion. For each anchor activity, identifying two or more compatible activities near the anchor activity during a time period that includes the anchor activity. The method can further include identifying one or more conveyances between the geographic locations and scoring activity sets that include activities for each of the geographic locations and at least one of the conveyances. The method can further include reporting at least some of the scored activity sets.

This method and other implementations of the technology disclosed can each optionally include one or more additional features described.

It can further include determining and reporting availability of the anchor activities and the conveyance. Or, determining and reporting online bookability of the anchor activities and the conveyance. It can further include reporting links to online booking for the anchor activities and the conveyance.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In another implementation, a method is described of scoring future activities using selected prior activities. This method can include receiving at least two prior activities indicative of a future activity to be recommended, evaluating the prior activities against a multi-dimensional qualitative taxonomy and identifying dimensions in common among the prior activities. It can further include applying a multi-dimensional qualitative taxonomy along the identified dimensions to score a plurality of future activities near the particular location in a particular time period responsive to the prior activities. It can further include reporting at least some of the scored future activities.

This method and other implementations of the technology disclosed can each optionally include one or more additional features described.

It can further include receiving data representing user choices that discard or accept the activities and evaluating the user choices against a multi-dimensional qualitative taxonomy and identifying dimensions that distinguish between the discarded activities and the accepted activities. It can further include reporting additional activities responsive to the identified dimensions as data representing additional user choices is received.

Other implementations may include a non-transitory computer readable storage medium storing instructions executable by a processor to perform a method as described above. Yet another implementation may include a system including memory and one or more processors operable to execute instructions, stored in the memory, to perform a method as described above.

We claim as follows:

1. A method of interpreting user gestures received from a gesture based user interface, including:
    providing a user interface for display on a screen that sequentially, not simultaneously presents a series of images representing options to accept or reject;
    wherein the user interface implements acceptance or rejection of an option with swiping a respective image in a first or second direction and off the screen, wherein the first and second directions are towards different sides of the screen, and wherein one of the first and second directions includes a swipe right;
    receiving input representing a user gesture of engagement with the respective image in the user interface and a swipe of the respective image in the first or second direction and off the screen;
    based on the first or second direction in the received input, accepting or rejecting the option represented by the respective image;
    receiving a series of inputs representing accepting and rejecting options; and
    using the options accepted and the options rejected, determining options to represent in subsequent images in the series.

2. The method of claim 1, wherein:
    the user interface further implements the acceptance or rejection of the option by flinging or flicking the respective image in the first or second direction and off the screen; and
    received input is given a same interpretation for swiping, flinging or flicking in the respective image in a particular direction and off the screen.

3. The method of claim 1, wherein one of the first and second directions includes a swipe left.

4. A non-transitory computer readable storage medium storing instructions executable by a processor to perform the method of claim 1.

5. A non-transitory computer readable storage medium storing instructions executable by a processor to perform the method of claim 2.

6. A system including memory and one or more processors operable to execute instructions, stored in the memory, to perform the method of claim 1.

7. A system including memory and one or more processors operable to execute instructions, stored in the memory, to perform the method of claim 2.

8. A method of interpreting user gestures received from a gesture based user interface, including:

providing a user interface for display on a screen that sequentially, not simultaneously presents a series of images representing options to accept or reject;

wherein the user interface implements acceptance or rejection of an option with swiping a respective image in a first or second direction and off the screen, wherein the first and second directions are towards different sides of the screen, and wherein one of the first and second directions includes a swipe downward;

receiving input representing a user gesture of engagement with the respective image in the user interface and a swipe of the respective image in the first or second direction and off the screen;

based on the first or second direction in the received input, accepting or rejecting the option represented by the respective image;

receiving a series of inputs representing accepting and rejecting options; and using the options accepted and the options rejected, determining options to represent in subsequent images in the series.

9. The method of claim 8, wherein:

the user interface further implements the acceptance or rejection of the option by flinging or flicking the respective image in the first or second direction and off the screen; and received input is given a same interpretation for swiping, flinging or flicking in the respective image in a particular direction and off the screen.

10. A non-transitory computer readable storage medium storing instructions executable by a processor to perform the method of claim 9.

11. A system including memory and one or more processors operable to execute instructions, stored in the memory, to perform the method of claim 9.

12. A method of interpreting user gestures received from a gesture based user interface, including:

providing a user interface for display on a screen that presents a stack of images representing options to accept or reject;

wherein the user interface implements acceptance or rejection of an option with swiping a top image on the stack in a first or second direction and off the screen, wherein the first and second directions are towards different sides of the screen, and wherein one of the first and second directions includes a swipe right or a swipe downward;

receiving input representing a user gesture of engagement with the top image in the user interface and a swipe of the top image in the first or second direction and off the screen;

based on the first or second direction in the received input, accepting or rejecting the option represented by the top image;

receiving a series of inputs representing accepting and rejecting options; and using the options accepted and the options rejected, determining options to represent in subsequent images in the stack.

13. The method of claim 12, wherein the user interface further implements acceptance or rejection of the option by flinging or flicking the respective image in the first or second direction and off the screen and received input is given a same interpretation for swiping, flinging or flicking in the first direction and off the screen.

14. A non-transitory computer readable storage medium storing instructions executable by a processor to perform the method of claim 12.

15. A non-transitory computer readable storage medium storing instructions executable by a processor to perform the method of claim 13.

16. A system including memory and one or more processors operable to execute instructions, stored in the memory, to perform the method of claim 12.

17. A system including memory and one or more processors operable to execute instructions, stored in the memory, to perform the method of claim 13.

* * * * *